(12) United States Patent
Willard

(10) Patent No.: US 6,866,325 B2
(45) Date of Patent: Mar. 15, 2005

(54) HARD-TOP CONVERTIBLE ROOF SYSTEM

(75) Inventor: Michael T. Willard, Harrison Township, Macomb County, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/643,714

(22) Filed: Aug. 19, 2003

(65) Prior Publication Data

US 2004/0041437 A1 Mar. 4, 2004

Related U.S. Application Data

(62) Division of application No. 09/930,739, filed on Aug. 15, 2001, now Pat. No. 6,659,534.

(51) Int. Cl.[7] .................................................. B60J 7/08
(52) U.S. Cl. .............. 296/108; 296/107.16; 296/107.17
(58) Field of Search ................................ 296/108, 109, 296/117, 107.07, 107.11, 107.15, 107.16, 107.17, 136, 76, 107.08

(56) References Cited

U.S. PATENT DOCUMENTS

| | | | |
|---|---|---|---|
| 404,405 A | | 6/1889 | Haughey |
| 1,184,734 A | | 5/1916 | Freeman |
| 1,784,279 A | | 12/1930 | Ellerbeck |
| 1,988,346 A | | 1/1935 | Wagner |
| 2,007,873 A | | 7/1935 | Paulin |
| 2,076,243 A | | 4/1937 | Marshall et al. |
| 2,322,839 A | * | 6/1943 | Falcon ........................ 296/117 |
| 2,564,446 A | | 8/1951 | Parsons |
| 2,580,486 A | | 1/1952 | Vigmostad |
| 2,596,355 A | | 5/1952 | Ackermans |
| 2,704,225 A | | 3/1955 | Anschuetz et al. |
| 2,747,928 A | | 5/1956 | Olivier et al. |
| 2,768,024 A | | 5/1956 | Spear, Jr. |
| 2,768,025 A | | 10/1956 | Spear, Jr. et al. |
| 2,812,975 A | * | 11/1957 | Warner ........................ 296/117 |

(List continued on next page.)

FOREIGN PATENT DOCUMENTS

| | | |
|---|---|---|
| BE | 493260 | 5/1950 |
| CH | 650980 | 8/1985 |
| DE | 646381 | 5/1937 |
| DE | 1 505 474 | 7/1969 |
| DE | 3416286 A1 | 10/1984 |
| DE | 3635373 A1 | 4/1988 |
| DE | 3635887 A1 | 5/1988 |
| DE | 3733892 A | 4/1989 |
| DE | 3816060 A | 11/1989 |
| DE | 9108242 | 12/1992 |

(List continued on next page.)

OTHER PUBLICATIONS

Alfa Romeo Proteo Or Alfa Romeo 164 Proteo / 1991 (believed to have been offered for sale, publicly used, and/or published prior to the filing date of this application).

Alfa Romeo Spider Rht / 2001.

Audi Quattro Roadster / 1984–1987 (believed to have been offered for sale, publicly used, and/or published prior to the filing date of this application).

(List continued on next page.)

Primary Examiner—Patricia L. Engle
(74) Attorney, Agent, or Firm—Harness, Dickey & Pierce, P.L.C.

(57) ABSTRACT

A convertible roof system includes a front roof section, a rear roof section, an automatically power actuator and a linkage mechanism. In another aspect of the present invention, the front and/or rear roof sections are rigid, hard-top roofs. A further aspect of the present invention provides that the outside surfaces of the roofs have a generally vertical orientation when in their open and retracted positions.

32 Claims, 18 Drawing Sheets

U.S. PATENT DOCUMENTS

| | | | |
|---|---|---|---|
| 2,841,441 A | 7/1958 | Evans | |
| 2,856,231 A | 10/1958 | Zeman | |
| 2,869,923 A | 1/1959 | Mulichak | |
| 2,919,156 A | 12/1959 | Dodge | |
| 2,939,742 A | 6/1960 | Dardarian et al. | |
| 2,997,337 A | 8/1961 | Day et al. | |
| 3,059,962 A | 10/1962 | Harms et al. | |
| 3,357,738 A | 12/1967 | Bourlier | |
| 3,375,037 A | 3/1968 | Hunt, Jr. | |
| 3,377,099 A | 4/1968 | Podolan | |
| 3,575,464 A | 4/1971 | Himka et al. | |
| 3,994,524 A | 11/1976 | Lehmann | |
| 4,168,859 A | 9/1979 | Breitschwerdt et al. | |
| 4,634,171 A | 1/1987 | McKeag | |
| 4,712,828 A | 12/1987 | Albrecht | |
| 4,729,592 A | 3/1988 | Tuchiya et al. | |
| 4,746,163 A | 5/1988 | Muscat | |
| 4,854,634 A | 8/1989 | Shiraishi et al. | |
| 4,895,409 A | 1/1990 | Konishi et al. | |
| 4,950,022 A | 8/1990 | Pattee | |
| 5,033,789 A | 7/1991 | Hayashi et al. | |
| 5,067,768 A | 11/1991 | Fischbach | |
| 5,078,447 A | 1/1992 | Klein et al. | |
| 5,090,764 A | 2/1992 | Kogawa et al. | |
| 5,161,852 A | 11/1992 | Alexander et al. | |
| 5,195,798 A | 3/1993 | Klein et al. | |
| 5,207,474 A | 5/1993 | Licher et al. | |
| 5,225,747 A | 7/1993 | Helms et al. | |
| 5,429,409 A | 7/1995 | Corder et al. | |
| 5,490,709 A | 2/1996 | Rahn | |
| 5,520,432 A | 5/1996 | Gmeiner et al. | |
| 5,533,777 A | 7/1996 | Kleeman et al. | |
| 5,542,735 A | 8/1996 | Furst et al. | |
| 5,593,202 A | 1/1997 | Corder et al. | |
| 5,649,733 A | 7/1997 | Seel et al. | |
| 5,743,587 A | 4/1998 | Alexander et al. | |
| 5,746,470 A | 5/1998 | Seel et al. | |
| 5,769,483 A | 6/1998 | Danzl et al. | |
| 5,785,375 A | 7/1998 | Alexander et al. | |
| 5,806,912 A | 9/1998 | Ramaciotti et al. | |
| D406,792 S | 3/1999 | Alexander et al. | |
| 5,979,970 A | 11/1999 | Rothe et al. | |
| 6,019,416 A | 2/2000 | Beierl | |
| 6,030,023 A | 2/2000 | Guillez | |
| 6,033,008 A | 3/2000 | Mattila | |
| 6,033,009 A | 3/2000 | Ritter et al. | |
| 6,033,012 A | 3/2000 | Russke et al. | |
| 6,053,560 A | 4/2000 | Rothe | |
| D427,138 S | 6/2000 | Alexander et al. | |
| 6,123,381 A | 9/2000 | Schenk | |
| 6,168,224 B1 | 1/2001 | Henn et al. | |
| 6,193,300 B1 | 2/2001 | Nakatomi et al. | |
| 6,217,104 B1 | 4/2001 | Neubrand | |
| D442,541 S | 5/2001 | Alexander et al. | |
| 6,273,492 B1 | 8/2001 | Schroder et al. | |
| 6,299,234 B1 | 10/2001 | Seel et al. | |
| 6,312,041 B1 | 11/2001 | Queveau et al. | |
| 6,312,042 B1 | 11/2001 | Halbweiss et al. | |
| 6,315,349 B1 | 11/2001 | Kinnanen | |
| 6,318,793 B1 | 11/2001 | Rapin et al. | |
| D452,675 S | 1/2002 | Alexander et al. | |
| 6,336,673 B1 | 1/2002 | Rothe et al. | |
| 6,347,828 B1 | 2/2002 | Rapin et al. | |
| 6,352,298 B1 | 3/2002 | Hayashi et al. | |
| 6,425,621 B2 * | 7/2002 | Miklosi et al. | 296/108 |
| 6,478,362 B2 | 11/2002 | Obendiek | |
| 6,497,447 B1 | 12/2002 | Willard | |
| 6,502,891 B2 | 1/2003 | Russke | |
| 6,502,892 B2 | 1/2003 | Eberle | |
| 6,505,881 B2 | 1/2003 | Kinnanen | |
| 6,592,169 B2 | 7/2003 | Obendiek | |
| 6,666,495 B2 | 12/2003 | Nania | |
| 6,682,125 B2 | 1/2004 | Guillez et al. | |
| 2001/0006297 A1 | 7/2001 | Dintner et al. | |
| 2001/0019213 A1 | 9/2001 | Eberle | |
| 2001/0020793 A1 | 9/2001 | Eberle | |
| 2001/0024050 A1 | 9/2001 | Schutt et al. | |
| 2001/0045759 A1 * | 11/2001 | Russke | 296/107.17 |
| 2002/0185886 A1 | 12/2002 | Obendiek | |
| 2004/0041436 A1 * | 3/2004 | Guillez et al. | 296/108 |

FOREIGN PATENT DOCUMENTS

| | | |
|---|---|---|
| DE | 4316485 A1 | 11/1994 |
| DE | 43 20 603 A1 | 1/1995 |
| DE | 43 24 708 A1 | 1/1995 |
| DE | 44 38 191 C1 | 7/1995 |
| DE | 44 38 190 C1 | 11/1995 |
| DE | 44 31 656 C1 | 12/1995 |
| DE | 4445580 C1 | 12/1995 |
| DE | 4445941 C1 | 3/1996 |
| DE | 4445944 C1 | 4/1996 |
| DE | 4446483 A1 | 6/1996 |
| DE | 195 17 063 C1 | 6/1996 |
| DE | 44 45 920 A1 | 7/1996 |
| DE | 195 14 022 C1 | 9/1996 |
| DE | 19518071 A1 | 11/1996 |
| DE | 19532568 C1 | 11/1996 |
| DE | 19532567 C1 | 12/1996 |
| DE | 197 14 139 A1 | 8/1998 |
| EP | 0261379 A2 | 4/1987 |
| EP | 0494366 A2 | 7/1992 |
| FR | 1049026 | 12/1953 |
| GB | 413467 | 7/1934 |
| GB | 455769 | 9/1936 |
| GB | 756531 | 9/1956 |
| GB | 978738 | 12/1964 |
| JP | 62-120222 | 6/1987 |
| JP | 2-51925 | 4/1990 |
| JP | 2-144226 | 4/1990 |
| JP | 3-273977 A | 12/1991 |

OTHER PUBLICATIONS

Bently Retractable Hardtop / 1999 (believed to have been offered for sale, publicly used, and/or published prior to the filing date of this application).

Bérard Roadster / 2001.

BMW Klapp Top / 2000 (believed to have been offered for sale, publicly used, and/or published prior to the filing date of this appliation).

Buick Blackhawk / 2000 (believed to have been offered for sale, publicly used, and/or published prior to the filing date of this application).

Cadillac Allanté Charisma / 1994 (believed to have been offered for sale, publicly used, and/or published prior to the filing date of this application).

Cadillac Evoq / 1999 (believed to have been offered for sale, publicly used, and/or published prior to the filing date of this application).

C&C Intrigue / 1990 (believed to have been offered for sale, publicly used, and/or published prior to the filing date of this application).

Chevrolet SSR / 2000 (believed to have been offered for sale, publicly used, and/or published prior to the filing date of this application).

Chevrolet Corvette Retractable Hardtop / 1958 (believed to have been offered for sale, publicly used, and/or published prior to the filing date of this application).

Chrysler Thunderbolt / 1941 (believed to have been offered for sale, publicly used, and/or published prior to the filing date of this application).
Chrysler Dart / 1957 (believed to have been offered for sale, publicly used, and/or published prior to the filing date of this application).
Chrysler Phaeton / 1997 (believed to have been offered for sale, publicly used, and/or published prior to the filing date of this application).
Citroën 15 Six / 1950 (believed to have been offered for sale, publicly used, and/or published prior to the filing date of this application).
Citroën 11 Légère / 1952 (believed to have been offered for sale, publicly used, and/or published prior to the filing date of this application).
Daihatsu Kopen / 1999 (believed to have been offered for sale, publicly used, and/or published prior to the filing date of this application).
Daihatsu Kopen / 2001.
Edsel Retractable Hardtop / 1958 (believed to have been offered for sale, publicly used, and/or published prior to the filing date of this application).
Edsel Skyliner / 1958 (believed to have been offered for sale, publicly used, and/or published prior to the filing date of this application).
Ferrari Testarossa St. Tropez / 1992 (believed to have been offered for sale, publicly used, and/or published prior to the filing date of this application).
Fiat Punto Wish / 1999 (believed to have been offered for sale, publicly used, and/or published prior to the filing date of this application).
Ford Fairlane 500 Skyliner / 1957 (believed to have been offered for sale, publicly used, and/or published prior to the filing date of this application).
Ford Fairlane 500 Skyliner / 1958 (believed to have been offered for sale, publicly used, and/or published prior to the filing date of this application).
Ford Galaxie Skyliner/ 1959 (believed to have been offered for sale, publicly used, and/or published prior to the filing date of this application).
Ford Mustang Restro–mod / 1964 (believed to have been offered for sale, publicly used, and/or published prior to the filing date of this application).
Ford Mustang Retractable Hardtop / 1964 (believed to have been offered for sale, publicly used, and/or published prior to the filing date of this appliation).
Ford Mustang Retractable Hardtop / 1966 (believed to have been offered for sale, publicly used, and/or published prior to the filing date of this application).
Ford Focus Cabriolet Retractable Hardtop / 1999 (believed to have been offered for sale, publicly used, and/or published prior to the filing date of this application).
Gaylord Gladiator / 1955–1956 (believed to have been offered for sale, publicly used, and/or published prior to the filing date of this application).
Heuliez Raffica / 1992 (believed to have been offered for sale, publicly used, and/or published prior to the filing date of this application).
Heuliez Hardtop Intruder / 1998 (believed to have been offered for sale, publicly used, and/or published prior to the filing date of this application).
Heuliez Retractop 2 / 2000 (believed to have been offered for sale, publicly used, and/or published prior to the filing date of this application).
Heuliez Retractop 10 / 2001.
Honda Argento Vivo / 1995 (believed to have been offered for sale, publicly used, and/or published prior to the filing date of this application).
Hudson Super Six / 1922 (believed to have been offered for sale, publicly used, and/or published prior to the filing date of this application).
Hudson Super Six / 1923 (believed to have been offered for sale, publicly used, and/or published prior to the filing date of this application).
Isuzu VX–02 / 1999 (believed to have been offered for sale, publicly used, and/or published prior to the filing date of this application).
Karmann Coupé–Cabrio / 1999 (believed to have been offered for sale, publicly used, and/or published prior to the filing date of this application).
Keinath GT/R / 1996–200x (believed to have been offered for sale, publicly used, and/or published prior to the filing date of this application).
Lada Roadster / 2000 (believed to have been offered for sale, publicly used, and/or published prior to the filing date of this application).
Lancia Belna Éclipse / 1934 (believed to have been offered for sale, publicly used, and/or published prior to the filing date of this application).
Lexus Sport Coupé/ 1999 (believed to have been offered for sale, publicly used, and/or published prior to the filing date of this application).
Lexus SC430 / 2000–200x (believed to have been offered for sale, publicly used, and/or published prior to the filing date of this application).
Mercedes–Benz Magic Top / 1984–1987 (believed to have been offered for sale, publicly used, and/or published prior to the filing date of this application).
Mercedes–Benz SLK Paris / 1994 (believed to have been offered for sale, publicly used, and/or published prior to the filing date of this application).
Mercedes–Benz SLK/ 1996–200x (believed to have been offered for sale, publicly used, and/or published prior to the filing date of this application).
Mercedes–Benz GLK / 1999 (believed to have been offered for sale, publicly used, and/or published prior to the filing date of this application).
Mercedes–Benz SL / 2001–200x.
Michalak Corsaspider / 1984–1988 (believed to have been offered for sale, publicly used, and/or published prior to the filing date of this application).
Mitsubishi Colt Aiolia / 1988 (believed to have been offered for sale, publicly used, and/or published prior to the filing date of this application).
Mitsubishi 3000 GT Spyder / 1994–1996 (believed to have been offered for sale, publicly used, and/or published prior to the filing date of this application).
Mohs Safarikar / 1972–1975 (believed to have been offered for sale, publicly used, and/or published prior to the filing date of this application).
Nissan Luc–2 / 1985 (believed to have been offered for sale, publicly used, and/or published prior to the filing date of this application).
Nissan 300 ZX / 1992 (believed to have been offered for sale, publicly used, and/or published prior to the filing date of this application).

Nissan Silvia Varietta / 1999 (believed to have been offered for sale, publicly used, and/or published prior to the filing date of this application).

Oldsmobile F–88 MK3 / 1959 (believed to have been offered for sale, publicly used, and/or published prior to the filing date of this application).

Paxton / 1951 (believed to have been offered for sale, publicly used, and/or published prior to the filing date of this appliation).

Peugeot 301 Éclipse / 1934 (believed to have been offered for sale, publicly used, and/or published prior to the filing date of this application).

Peugeot 601c Éclipse / 1934 (believed to have been offered for sale, publicly used, and/or published prior to the filing date of this application).

Peugeot 601dl Éclipse / 1934 (believed to have been offered for sale, publicly used, and/or published prior to the filing date of this application).

Peugeot 401d Éclipse / 1934–1935 (believed to have been offered for sale, publicly used, and/or published prior to the filing date of this application).

Peugeot 601d Éclipse / 1934–1935 (believed to have been offered for sale, publicly used, and/or published prior to the filing date of this application).

Peugeot 402 Éclipse Électrique / 1935–1936 (believed to have been offered for sale, publicly used, and/or published prior to the filing date of this application).

Peugeot 402 Éclipse / Mécanique / 1936–1938 (believed to have been offered for sale, publicly used, and/or published prior to the filing date of this application).

Peugeot 202 Éclipse / 1938 (believed to have been offered for sale, publicly used, and/or published prior to the filing date of this application).

Peugeot 402b Éclipse Mécanique / 1938–1939 (believed to have been offered for sale, publicly used, and/or published prior to the filing date of this application).

Peugeot 106 Spider / 1992 (believed to have been offered for sale, publicly used, and/or published prior to the filing date of this application).

Peugeot 20▨/ 1998 (believed to have been offered for sale, publicly used, and/or published prior to the filing date of this application).

Peugeot Crisalys / 1998 (believed to have been offered for sale, publicly used, and/or published prior to the filing date of this application).

Peugeot 607 Paladine / 2000 (believed to have been offered for sale, publicly used, and/or published prior to the filing date of this application).

Peugeot 206 CC / 2000–200x (believed to have been offered for sale, publicly used, and/or published prior to the filing date of this application).

Peugeot 206 CC Ciel Bleu / 2001.

Playboy / 1947–1951 (believed to have been offered for sale, publicly used, and/or published prior to the filing date of this application).

Scimitar Hard–Top Convertible / 1959 (believed to have been offered for sale, publicly used, and/or published prior to the filing date of this application).

Skyline X–50 / 1953 (believed to have been offered for sale, publicly used, and/or published prior to the filing date of this application).

Suzuki C2 / 1997 (believed to have been offered for sale, publicly used, and/or published prior to the filing date of this application).

Toyota MRJ / 1995 (believed to have been offered for sale, publicly used, and/or published prior to the filing date of this application).

Toyota Soarer / 2000–200x (believed to have been offered for sale, publicly used, and/or published prior to the filing date of this application).

Treser T1 / 1987–198x (believed to have been offered for sale, publicly used, and/or published prior to the filing date of this application).

Valmet Boreal / 1997 (believed to have been offered for sale, publicly used, and/or published prior to the filing date of this application).

Volvo C70 Hatric / 2001 (believed to have been offered for sale, publicly used, and/or published prior to the filing date of this application).

Volvo Lowrider / 19xx (believed to have been offered for sale, publicly used, and/or published prior to the filing date of this application).

Picture of a 1957 Ford Fairlane retractable convertible, The Detroit News, Apr. 6, 1994.

Viper Pure Performance by Dodge/Auto Editors of Consumer Guide, Publications International, Ltd., pp. 6 and 7, 1993.

Automotive Industries, Feb. 1990, p. 75, showing "C & C Intrigue".

Automotive Revue, Sep. 5, 1991, cover page and p. 29 (including English translation.

Car Styling 86, Jan. 1992, cover page and pp. 64–67 (including English translation).

Introducing the Chevy SSR, Aug. 2000, 2 pgs. (and description of corresponding public use).

European Search Report for EP 02 25 5046, dated Oct. 8, 2003, 2 pages.

* cited by examiner

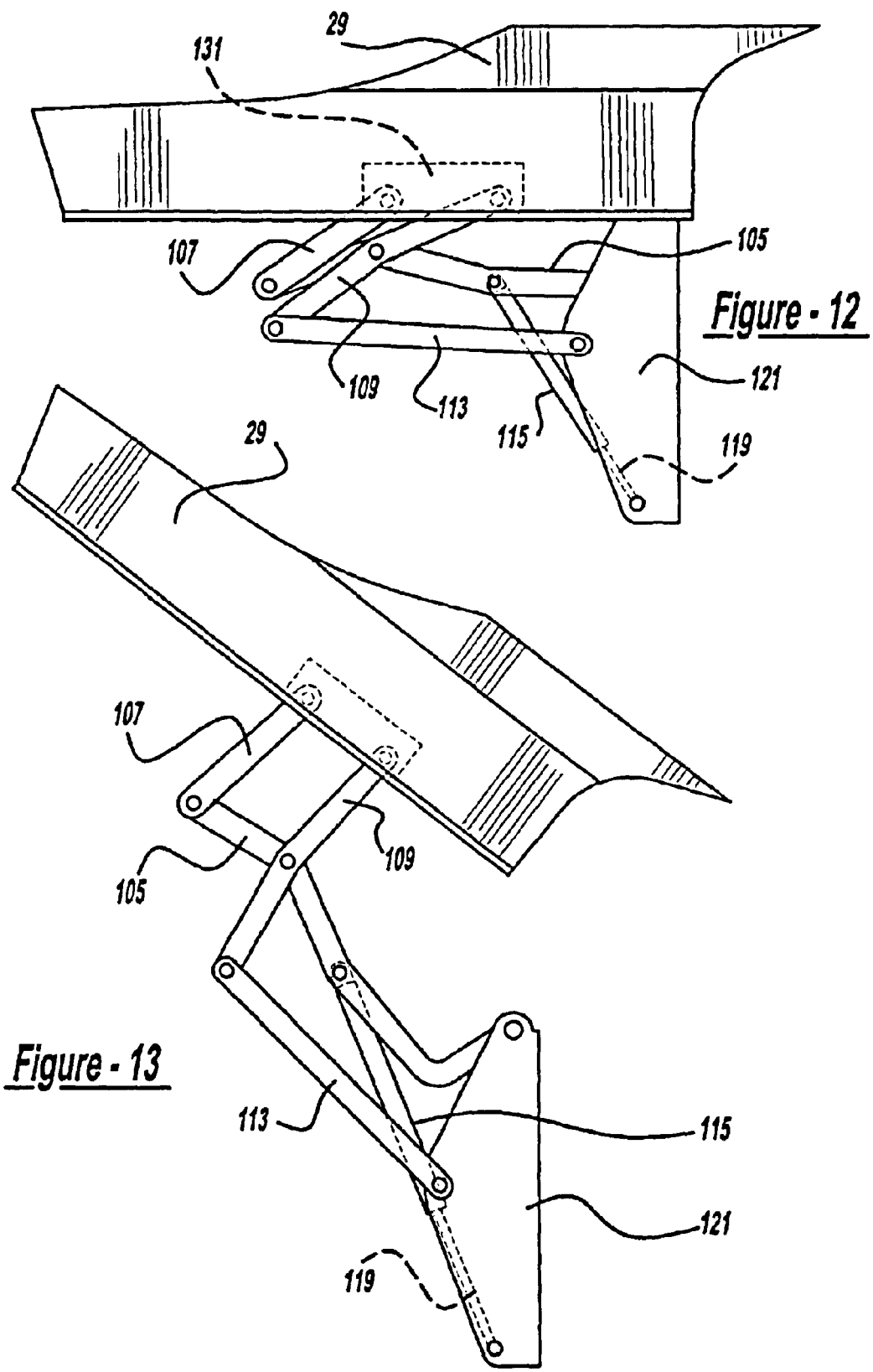

HARD-TOP CONVERTIBLE ROOF SYSTEM

BACKGROUND AND SUMMARY OF THE INVENTION

This invention relates generally to automotive roof systems and more particularly to a convertible roof system for an automotive vehicle.

Rigid hard-top convertible roofs have been used on a variety of automotive vehicles. Some of these conventional convertible hard-top roofs are stored in a generally vertical orientation and some are stored in a predominantly horizontal orientation. Furthermore, some of these conventional hard-top roofs fold in a clamshelling manner while others are collapsible in an overlapping manner. Most convertible hard-top roofs, however, employ a complicated linkage arrangement to couple the forwardmost hard-top roof section to either the vehicle body or the rear hard-top roof section. This is often due to the weight and moment-arm effect of the front roof section during retraction. For example, many of these known mechanisms use an elongated balance link coupling the body to the front roof section, or an elongated sliding or track guide secured to the vehicle body and coupled to a link; notwithstanding, such mechanisms may pose packaging and assembly obstacles in the typically tight confines of the vehicle body. Additionally, many of these traditional roof sections are difficult to tightly nest together in a stowed position in order to minimize the convertible roof storage space in the vehicle.

Examples of traditional hard-top convertible roofs are disclosed in the following patents: U.S. Pat. No. 5,979,970 entitled "Roof Assembly for a Convertible Vehicle" which issued to Rothe et al. on Nov. 9, 1999; U.S. Pat. No. 5,785,375 entitled "Retractable Hard-Top for an Automotive Vehicle" which issued to Alexander et al. on Jul. 28, 1998; U.S. Pat. No. 5,769,483 entitled "Convertible Motor Vehicle Roof" which issued to Danzl et al. on Jun. 23, 1998; U.S. Pat. No. 5,743,587 entitled "Apparatus for Use in an Automotive Vehicle having a Convertible Roof System" which issued to Alexander et al. on Apr. 28, 1998; and EPO Patent Publication No. 1 092 580 A1 which was published on Apr. 18, 2001. The U.S. patents are incorporated by reference herein.

In accordance with the present invention, a convertible roof system includes a front roof section, a rear roof section, an automatically power actuator and a linkage mechanism. In another aspect of the present invention, the front and/or rear roof sections are rigid, hard-top roofs. A further aspect of the present invention provides that the outside surfaces of the roofs have a generally vertical orientation when in their open and retracted positions. In yet another aspect of the present invention, a linkage assembly having at least a four-bar linkage arrangement couples the front roof section to the rear roof section. The convertible roof system employs another linkage assembly having at least a four-bar linkage arrangement which couples the rear roof section to the vehicle body, in still another aspect of the present invention. A further aspect of the present invention provides that a single link adjacent to each outboard side of the front roof is the sole mechanism which couples together the hard-top front roof to the rear roof and the top stack mechanism. Another aspect of the present invention uses a rigid tonneau cover and tonneau cover linkage mechanism to cover a roof storage space which does not obstruct a trunk or bed area of the vehicle. In a further aspect of the present invention, a supplemental automatic actuator is operable to more closely store together the fully retracted front and rear roof sections.

The hard-top convertible roof system of the present invention is advantageous over conventional systems in that the present invention minimizes the stored roof packaging area by tightly collapsing one roof section relative to the other. The present invention convertible roof system is also advantageous by employing a relatively powerful and easy to package linkage mechanism that allows for collapsing of the relatively heavy hard-top roof sections with minimal, if any, intrusion on the passenger compartment area of the vehicle while also storing the roof forward of a user accessible storage area, such as a trunk or pickup truck bed. Furthermore, the present invention does not require as great a centerline opening for the roof storage area as do many traditional hard and soft-top convertible roofs. The convertible roof system of the present invention is also simpler and less costly to assemble to the vehicle body since fewer body attachment points are used. Additional advantages and features of the present invention will become apparent from the following description and appended claims, taken in conjunction with the accompanying drawings.

BRIEF DESCRIPTION OF THE DRAWINGS

FIG. 12 is a side elevational view showing the tonneau cover mechanism employed in the preferred embodiment hard-top convertible roof system, disposed in a fully closed position;

FIG. 13 is a side elevational view showing the tonneau cover mechanism employed in the preferred embodiment hard-top convertible roof system, disposed in a partially open position;

DETAILED DESCRIPTION OF THE PREFERRED EMBODIMENT

Figure 1:
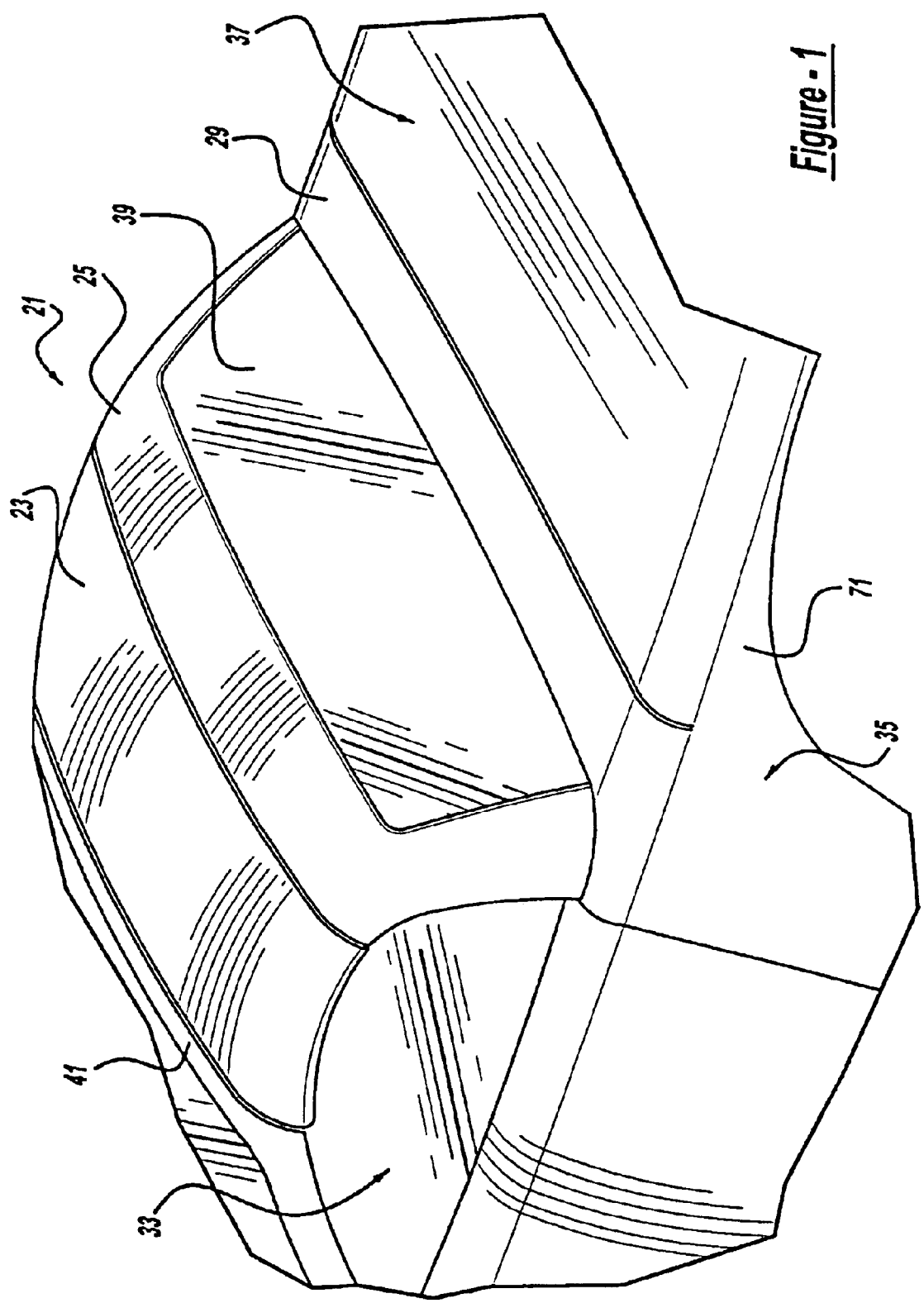
FIG. 1 is a fragmentary, perspective view, as observed from the rear left corner of the vehicle, showing the preferred embodiment of a hard-top convertible roof system of the present invention disposed in a fully closed and raised position.
Figure 2:
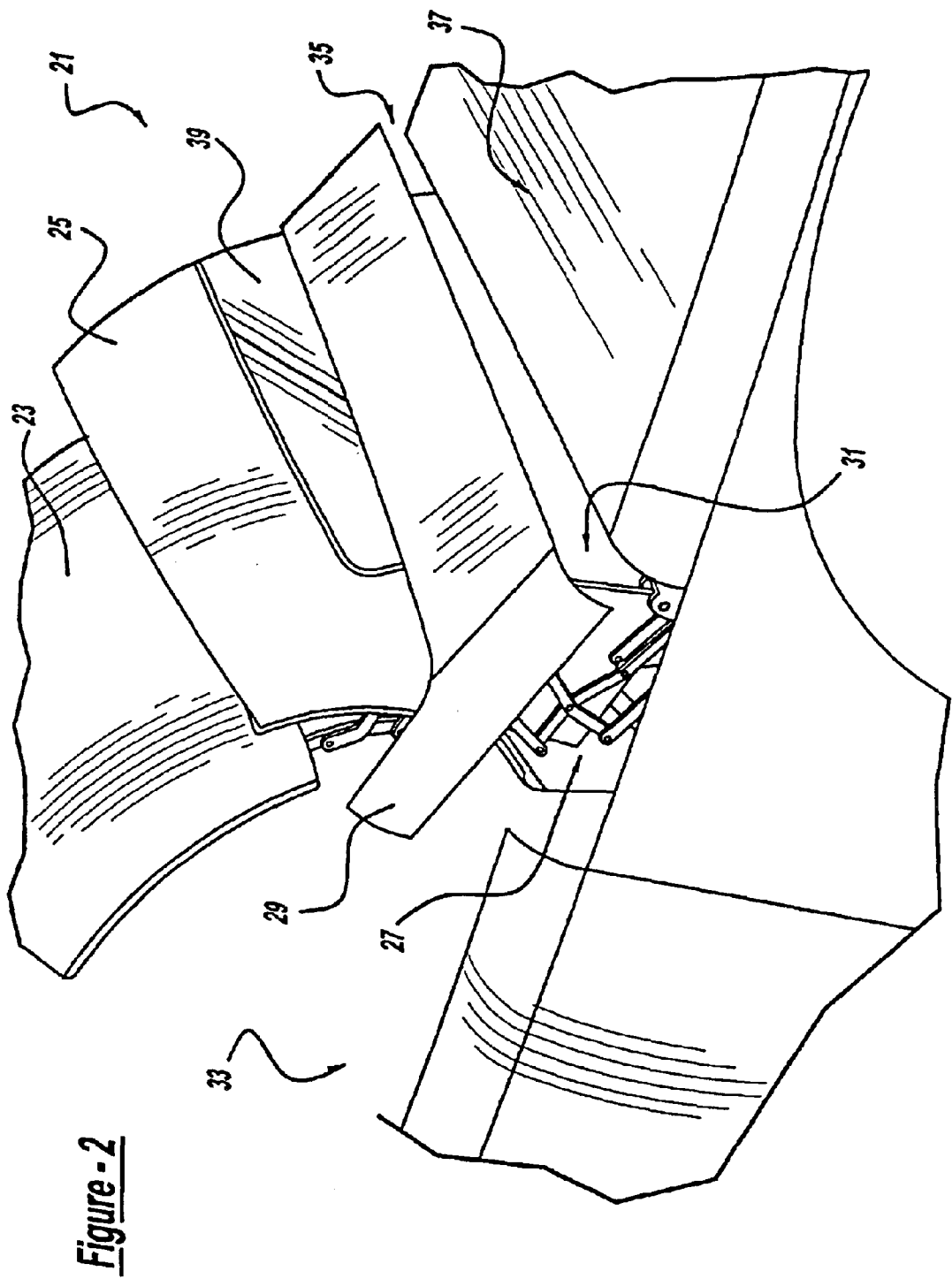
FIG. 2 is a fragmentary and perspective view, like that of FIG. 1, showing the preferred embodiment hard-top convertible roof system disposed in a partially retracted position.
Figure 3:
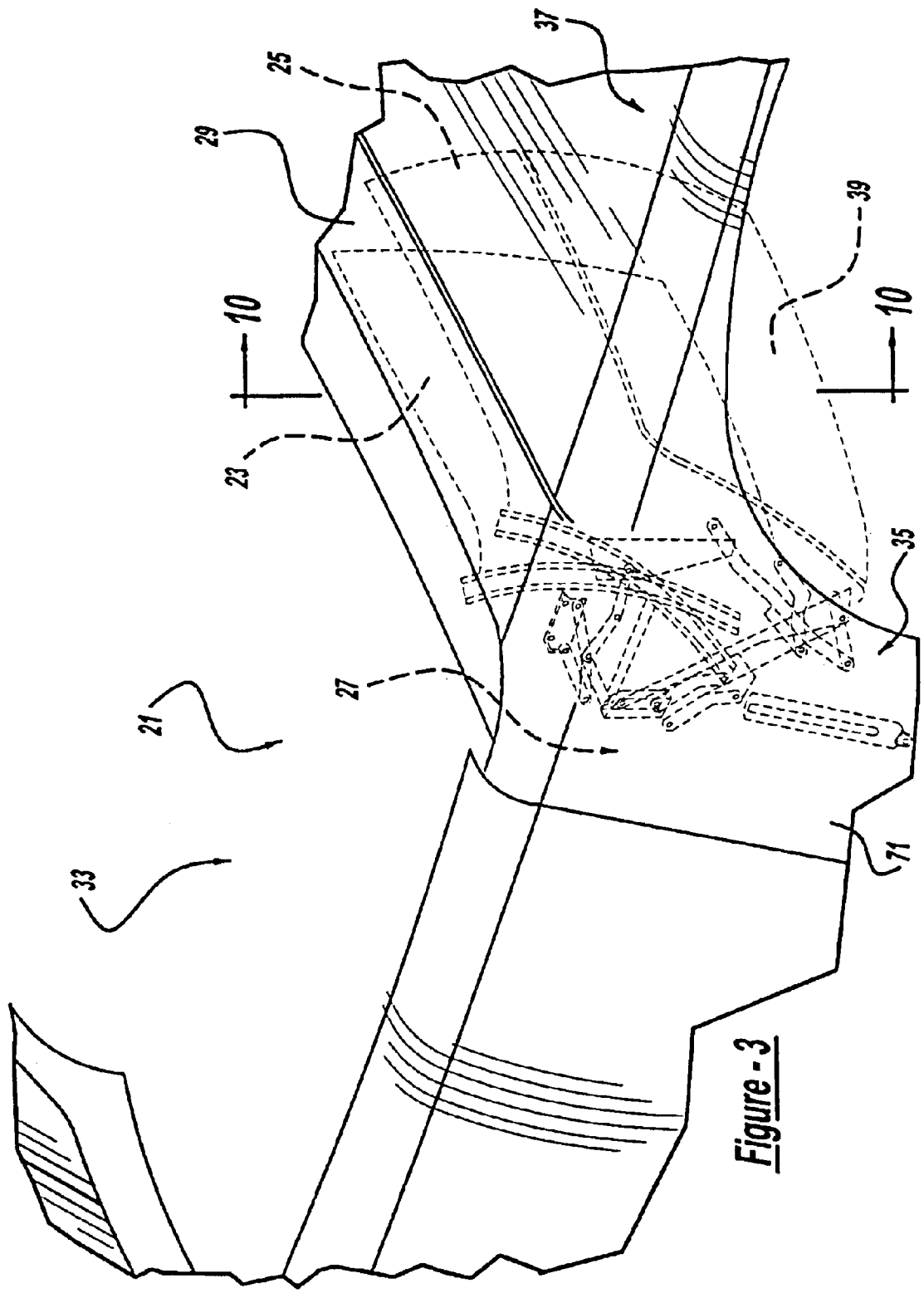
FIG. 3 is a fragmentary and perspective view, like that of FIG. 1, showing the preferred embodiment hard-top convertible roof system disposed in a fully open and retracted position.
Figure 4:
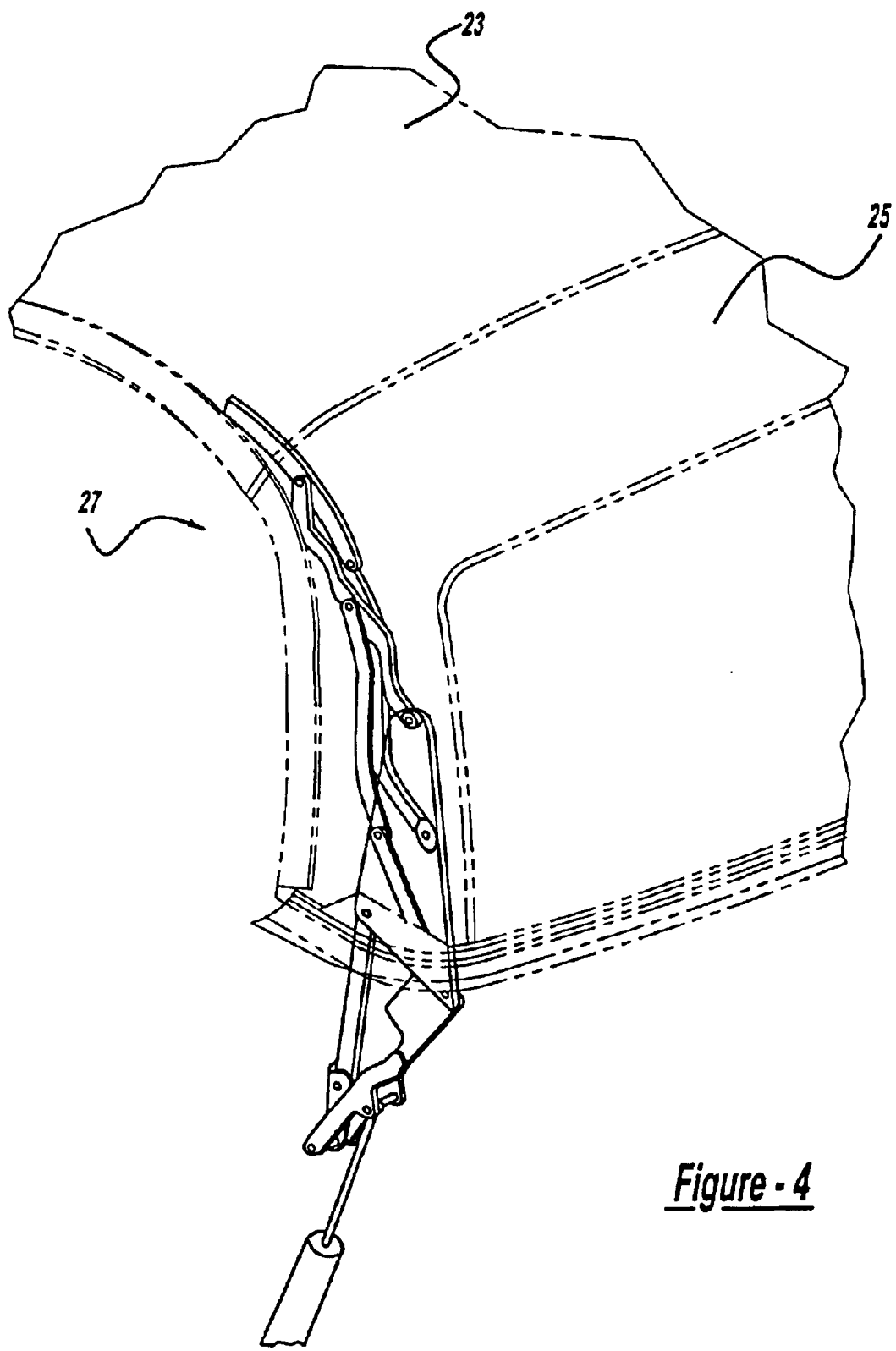
FIG. 4 is a perspective view, like that of FIG. 1, showing a top stack mechanism employed in the preferred embodiment hard-top convertible roof system, disposed in a fully raised position.
Figure 5:
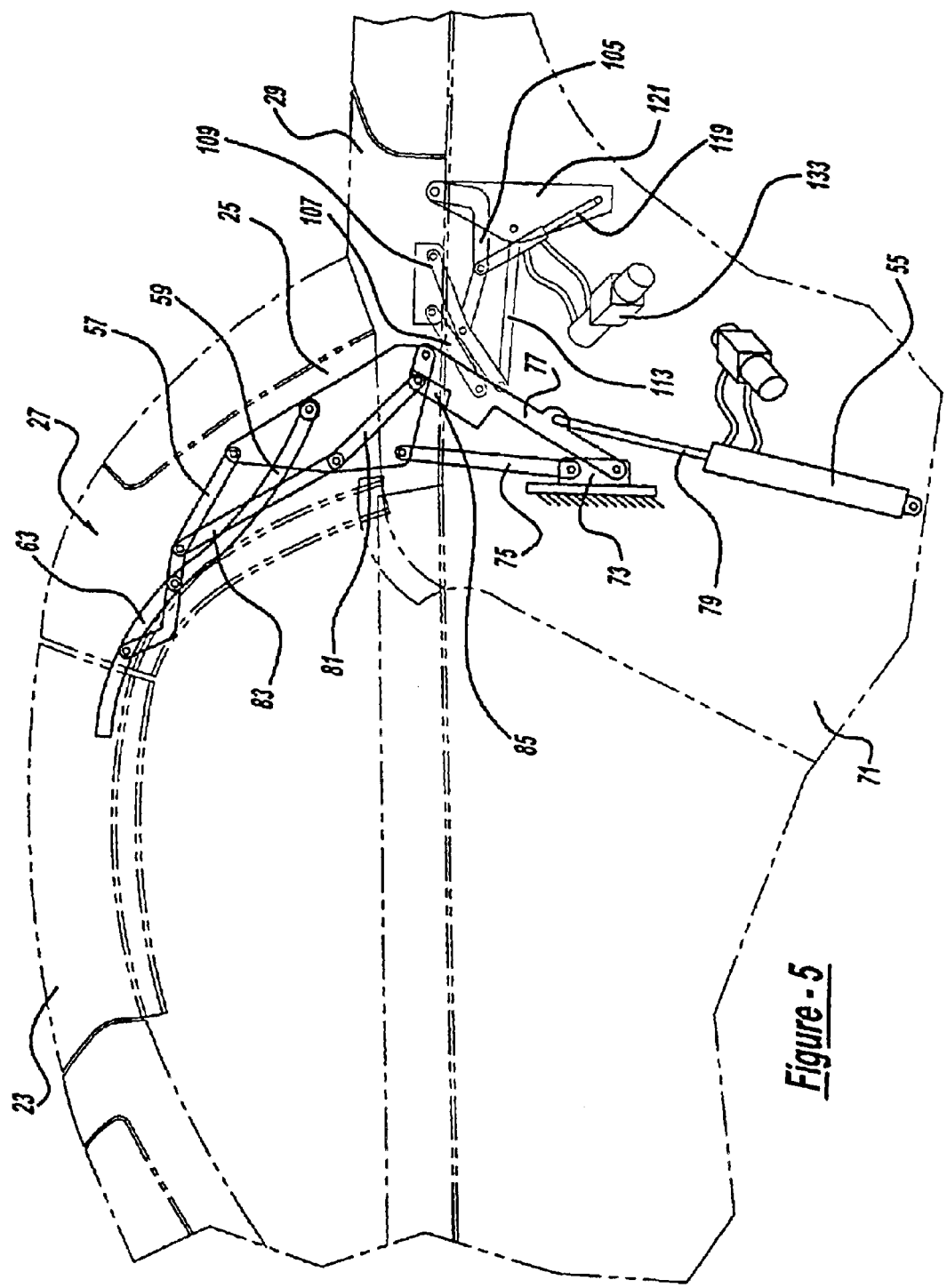
FIG. 5 is a side diagrammatic view showing the top stack mechanism and a tonneau cover mechanism employed in the preferred embodiment hard-top convertible roof system, disposed in the fully raised roof and closed tonneau cover positions.
Figure 6:
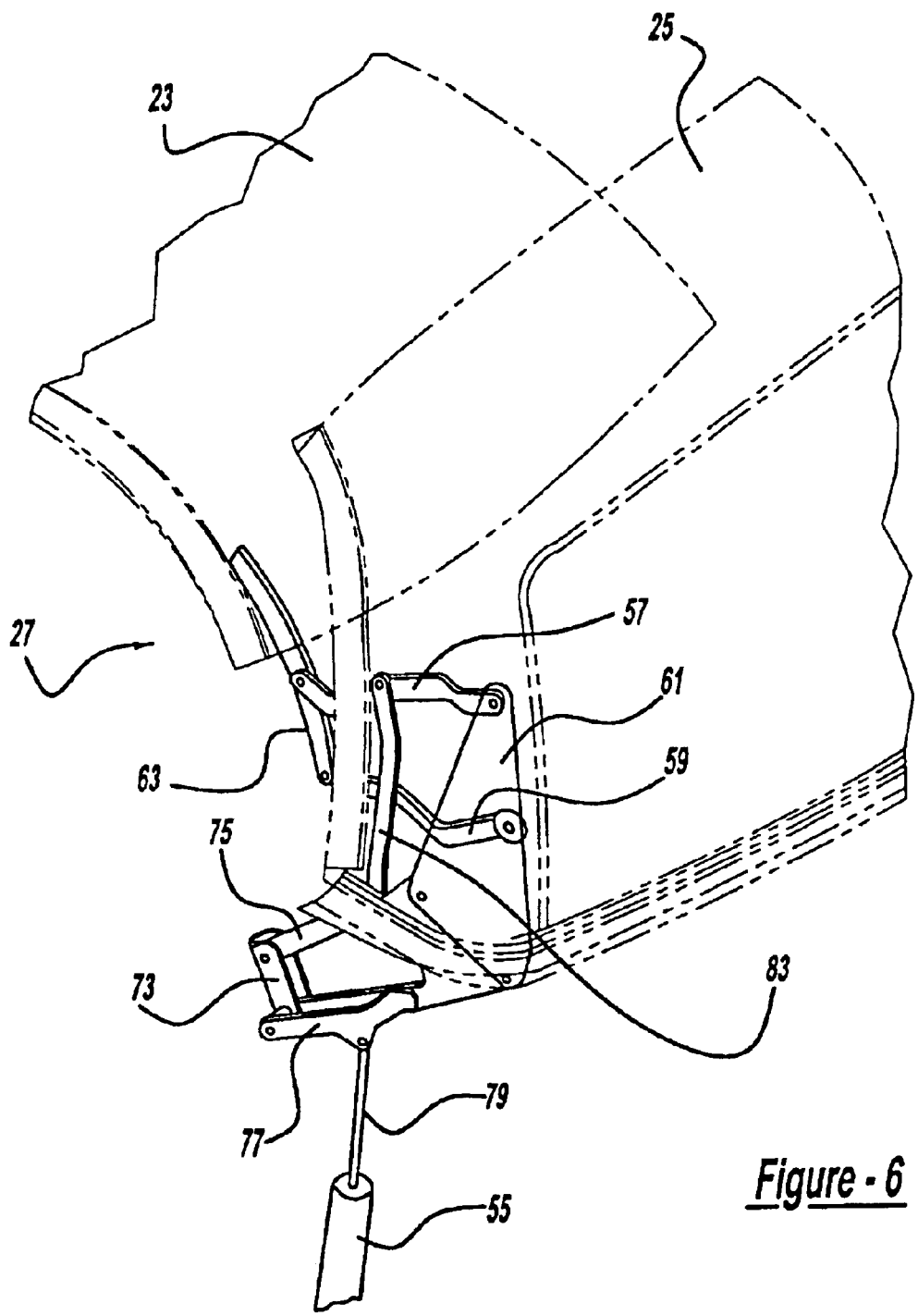
FIG. 6 is a perspective view, like that of FIG. 1, showing the top stack mechanism employed in the preferred embodiment hard-top convertible roof system, disposed in a partially retracted position.
Figure 7:
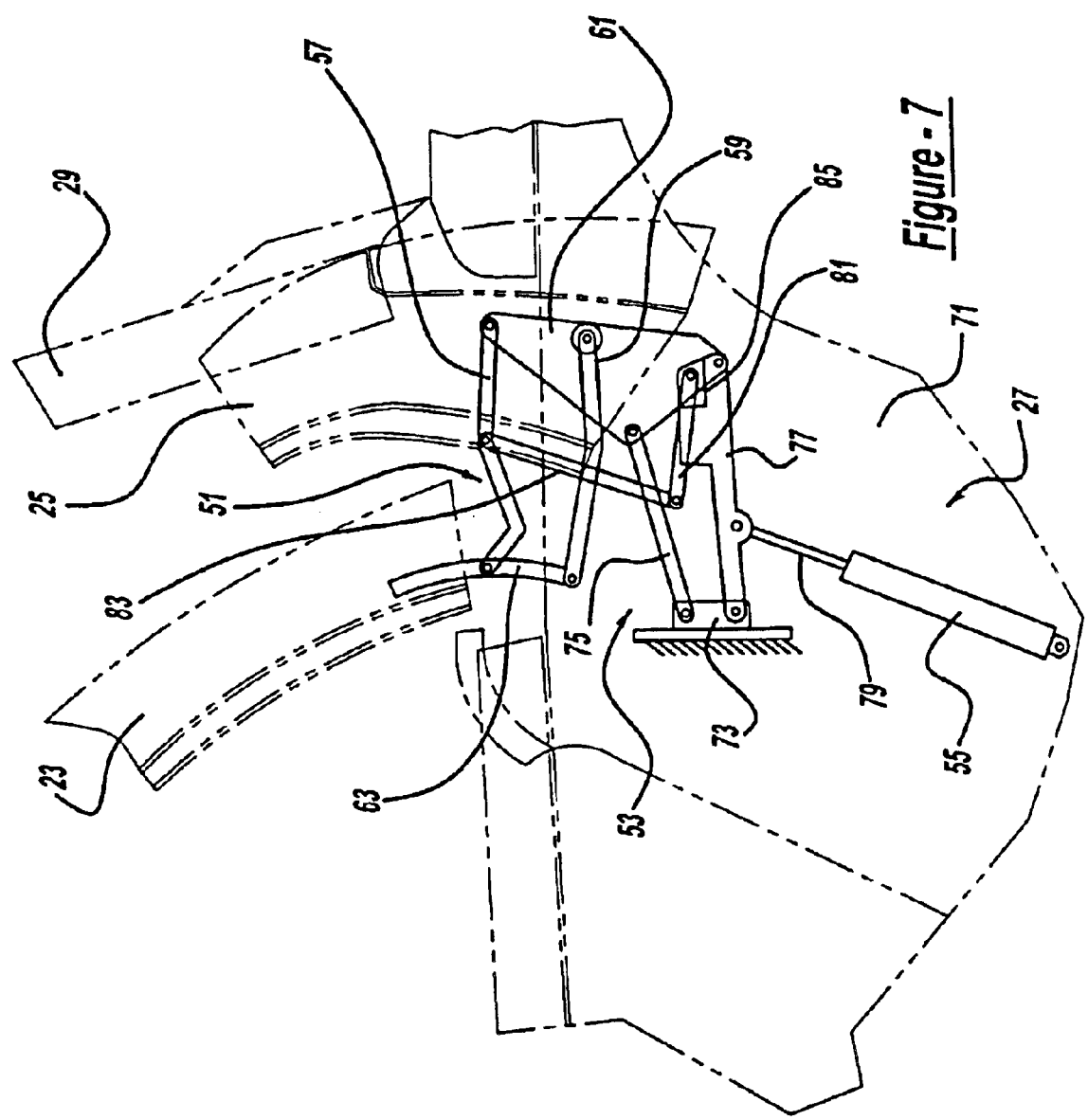
FIG. 7 is a side diagrammatic view showing the top stack mechanism employed in the preferred embodiment hard-top convertible roof system, disposed in the partially retracted position.
Figure 8:
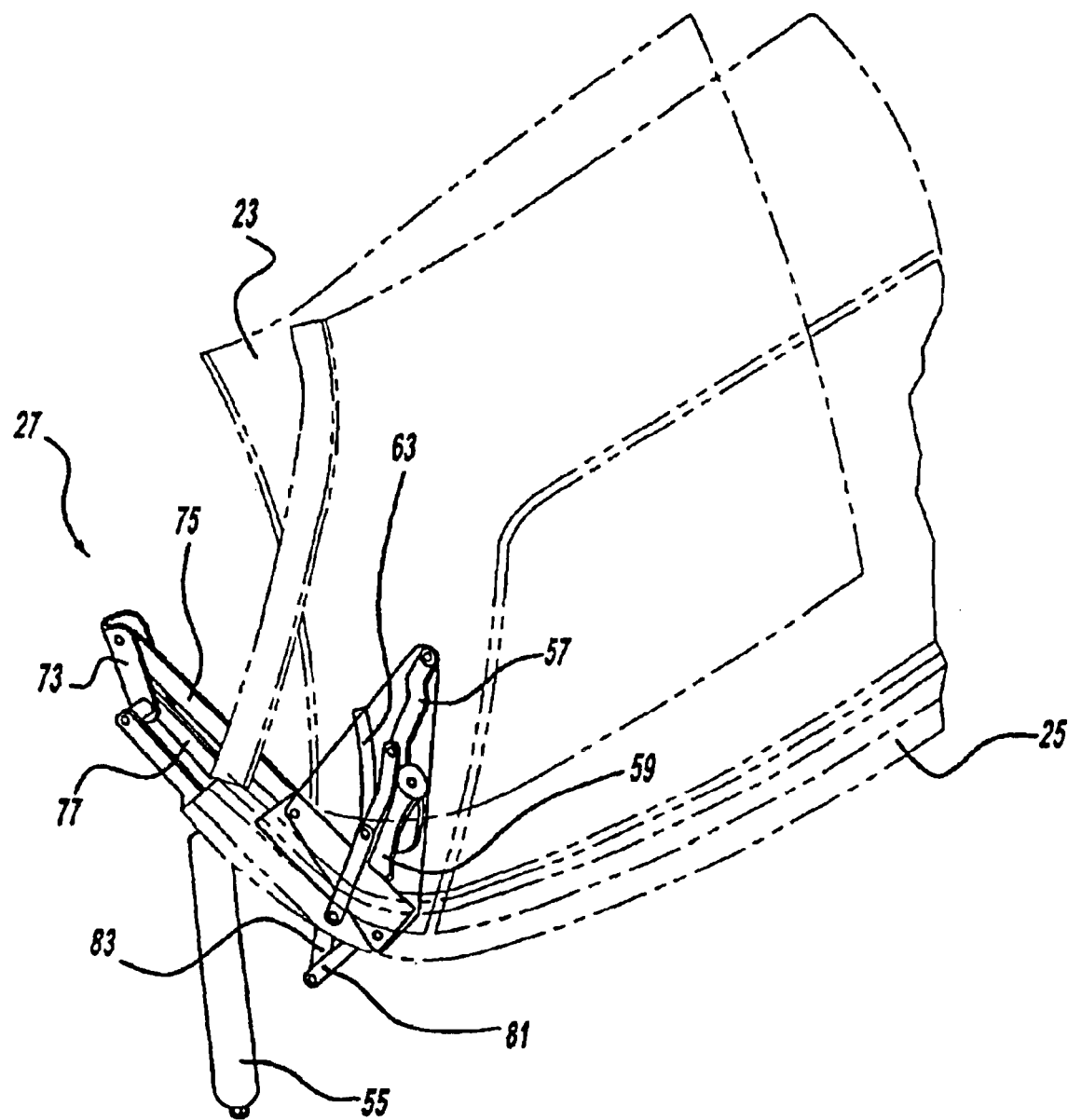
FIG. 8 is a perspective view, like that of FIG. 1, showing the top stack mechanism employed in the preferred embodiment hard-top convertible roof system, disposed in the fully retracted position.
Figure 9:
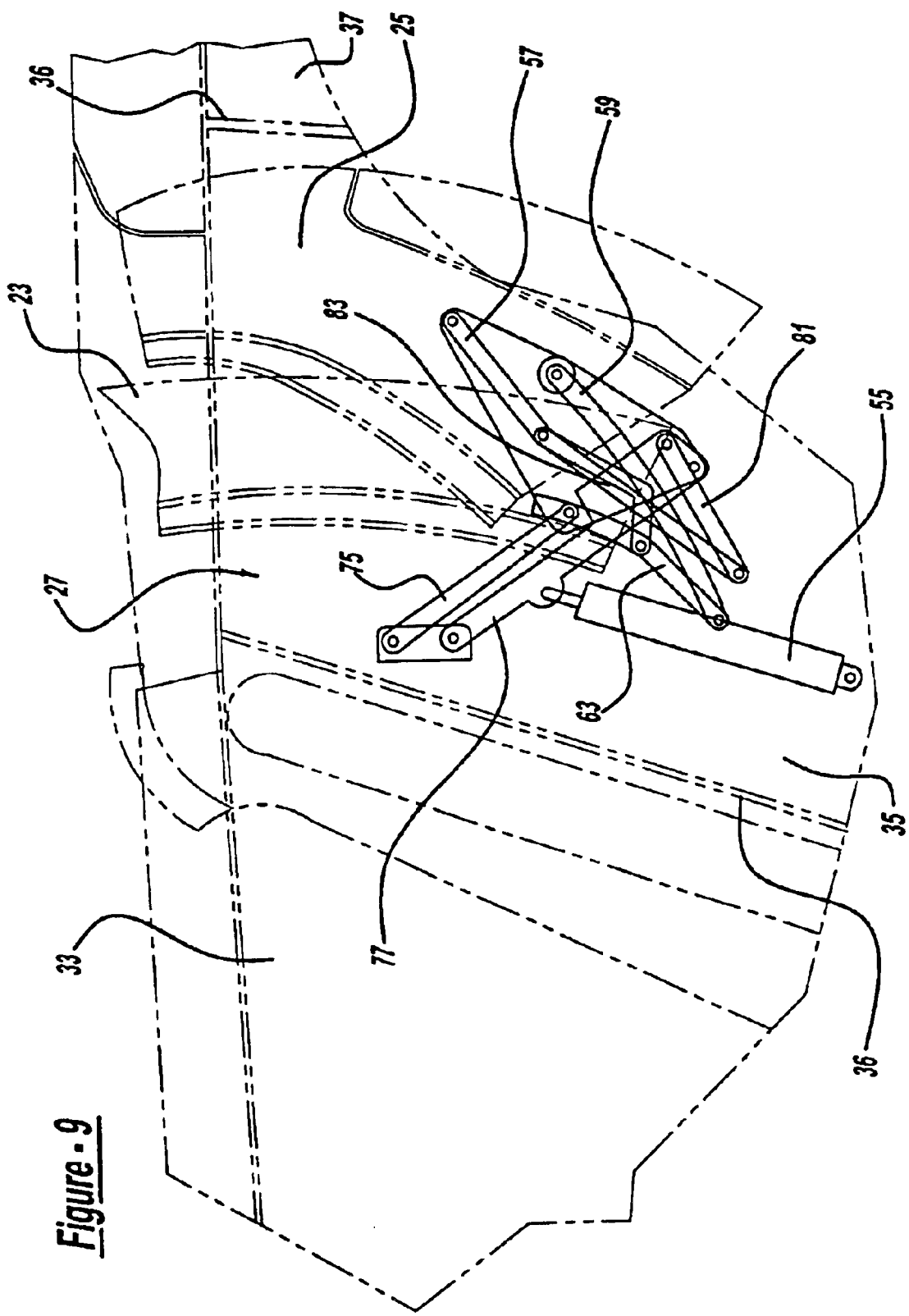
FIG. 9 is a side diagrammatic view showing the top stack mechanism employed in the preferred embodiment hard-top convertible roof system, disposed in the fully retracted position.
Figure 10:
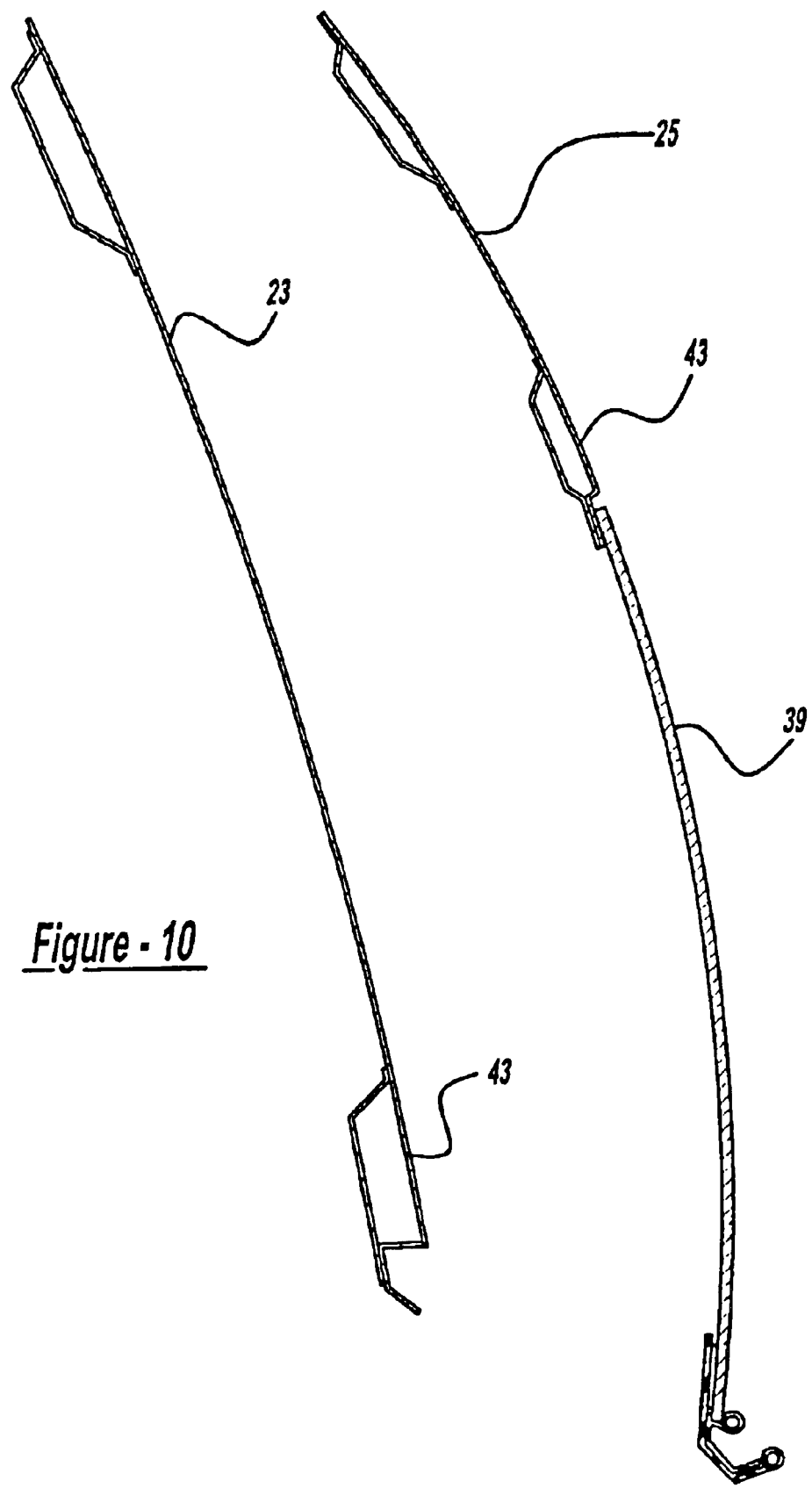
FIG. 10 is a centerline cross sectional view, taken along line 10—10 of FIG. 3, showing the preferred embodiment hard-top convertible roof system.
Figure 11:
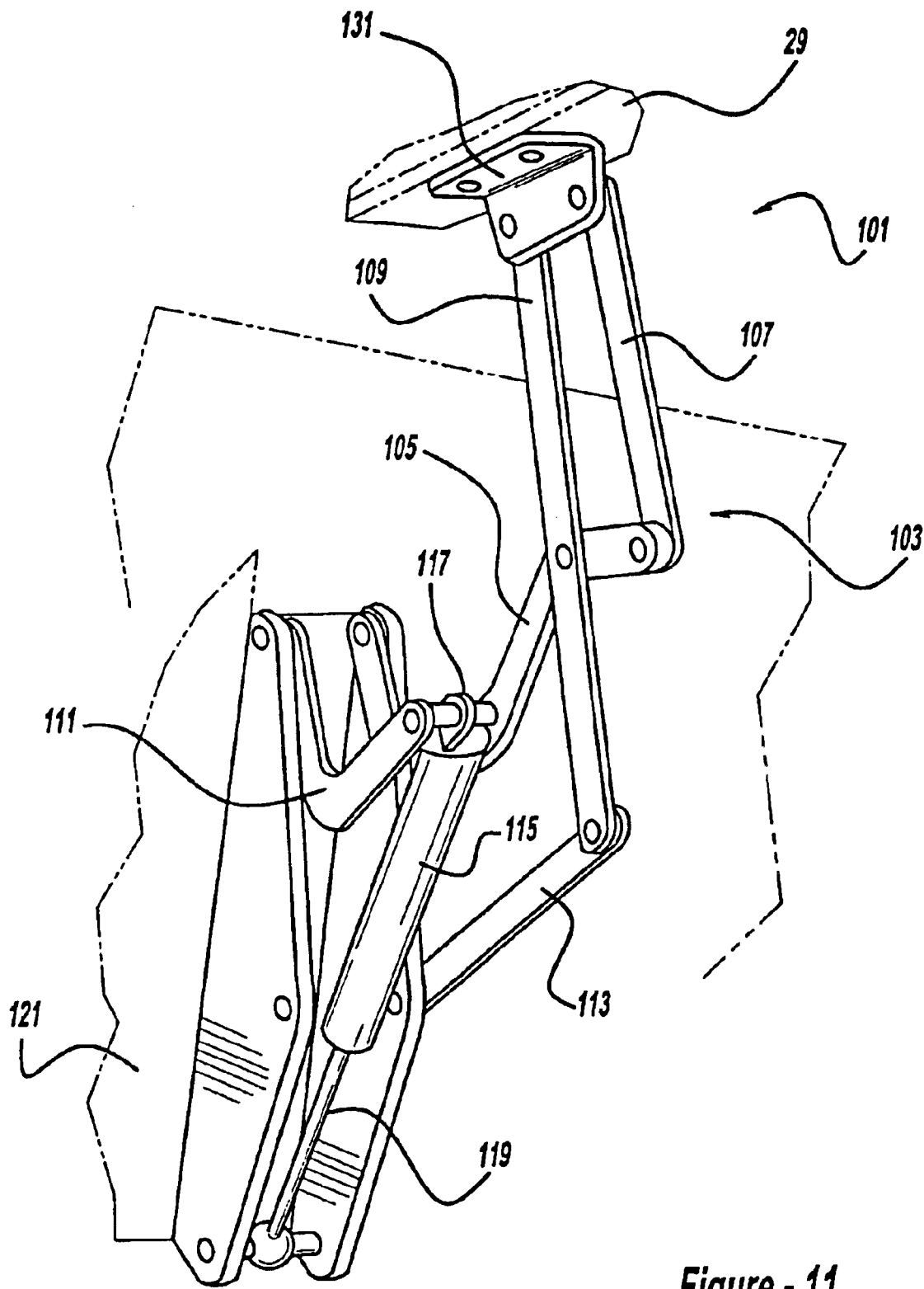
FIG. 11 is a front perspective view showing the tonneau cover mechanism employed in the preferred embodiment hard-top convertible roof system, disposed in a partially open position.
Figure 14:
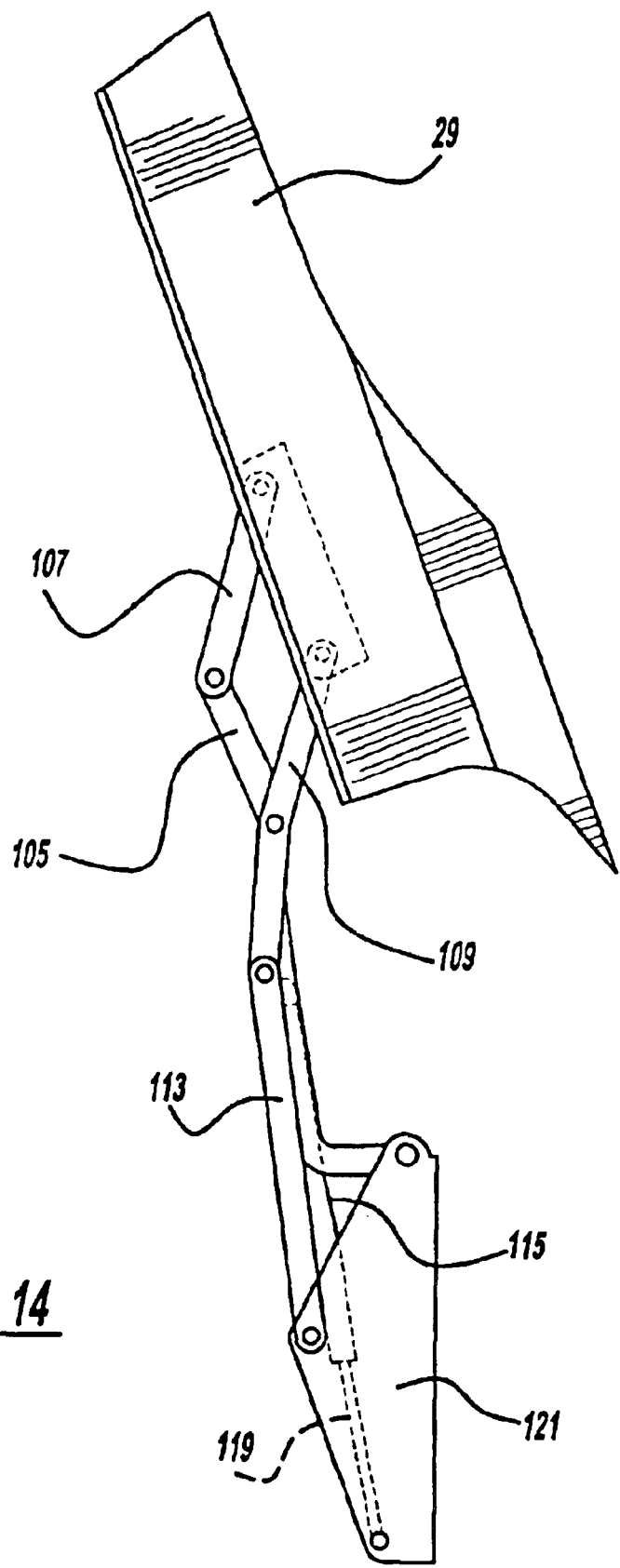
FIG. 14 is a side elevational view showing the tonneau cover mechanism employed in the preferred embodiment hard-top convertible roof system, disposed in a fully open position.

Referring to FIGS. 1–3 and 10, a convertible roof system 21 is part of an automotive vehicle and includes a hard-top front roof 23, a hard-top rear roof 25, a top stack mechanism 27 operable to move the roofs, a rigid tonneau cover 29 and a tonneau cover mechanism 31. Roofs 23 and 25 are automatically movable from fully raised and closed positions covering a passenger compartment 33, as shown in FIG. 1, to fully retracted and open positions, as shown in FIGS. 3 and 10, wherein roofs 23 and 25 are stowed in a roof storage area or compartment 35. Roof storage compartment 35 is located between and physically separated by metal panels 36 (see FIG. 9) from passenger compartment 33 and an externally accessible storage area for miscellaneous articles such as a trunk or pickup truck bed 37. A rigid, glass back window or backlite 39 is secured to rear roof 25 while front roof 23 is disengagably attached to a front header panel 41 by latches. Weatherstrips or seals are also employed around the peripheral edges of roofs 23 and 25. Roofs 23 and 25 are preferably stamped from aluminum or steel sheets and include inner reinforcement panels, but the roofs may alternately be formed from polymeric composites. Roofs 23 and 25 have opaque outside surfaces 43 that are typically painted. These outside surfaces 43 define three-dimensionally curved planes which are stored in a predominantly vertical and parallel nested orientation when fully retracted and stowed; this can be observed best in FIGS. 9 and 10.

Top stack mechanism 27 is in mirrored symmetry in both outboard sides of the vehicle and will only be described for the left-hand side with reference to FIGS. 4 through 9. Top stack mechanism 27 includes a first four-bar linkage assembly 51, a second four-bar linkage assembly 53 and a primary hydraulic actuator 55. First, four-bar linkage assembly 51 couples front roof 23 to rear roof 25 and includes a pair of somewhat parallel links 57 and 59 (as viewed in FIGS. 6 and 7) pivotally attached to a rear roof-mounted plate 61. The opposite ends of links 57 and 59 are pivotally joined to a single link 63 which rearwardly extends from front roof 23 and is attached to an outboard side rail area of front roof 23. Single link 63 can alternately be considered a rearwardly extending bracket bolted to the side rail reinforcement structure of the front roof.

Second four-bar linkage assembly 53 couples rear roof 25 to the vehicle body 71 by way of a stationarily mounted bracket 73 welded, bolted or otherwise secured to an inner quarter panel or the like. Second four-bar linkage assembly 53 includes a pair of somewhat parallel links 75 and 77 (as viewed in FIGS. 6 and 7) which each have a proximal end pivotally coupled to bracket 73. A distal end of link 75 is pivotally coupled to plate 61 attached to rear roof 25. A distal end of link 77 is enlarged and is pivotally attached to plate 61.

An end of a linearly extendable piston rod 79 of hydraulic actuator 55 is pivotally coupled to an intermediate or middle section of link 77. Furthermore, a control linkage mechanism couples together first and second four-bar linkages, respectively 51 and 53. Control linkage mechanism includes a first drive link 81 and a second drive link 83 pivotally coupled to the first drive link. An end of first drive link 81 is pivotally coupled to the enlarged section of link 77 while an end of drive link 83 is pivotally coupled to a middle or intermediate section of link 57. A hydraulically actuated rotary actuator 85 has a housing mounted to the enlarged section of link 77 and has a rotatable output gear or shaft which engages a splined receptacle of link 81 and operably causes link 81 to rotate relative to link 77. Rotary actuator 85 can be obtained from either Power Packer Co. of Germany or Hoerbriger Co. of Germany.

Roofs 23 and 25 can be tightly and closely nested together when fully retracted and the centerline, fore-and-aft roof storage area opening can be minimized due to the four-bar linkages 51 and 53, rotary actuator 85 and links 81 and 83. Furthermore, the four-bar linkage arrangements provide for very powerful and balanced movement, both between the vehicle body and the rear roof, and also between the roofs themselves, with very compact retracting and advancing space and with relatively short and tightly packaged links. Accordingly, only a single link attaches each outboard edge of front roof 23 to the remainder of the top stack mechanism and no difficult to package balance links are required with this preferred embodiment system. Guides, tracks and cables are also not necessary with the presently preferred embodiment since the present invention can be very easily mounted to the vehicle through the easy to attach bracket 73 and hydraulic actuator 55 body mounting. This non-guide construction also reduces side-to-side binding during roof movement. It should be appreciated, however, that a balance link, extra front roof attachments or guides can be alternately employed, but certain advantages of the present invention would be sacrificed.

A tonneau cover mechanism 101 and tonneau cover 29 are best shown in FIGS. 11–14; only one side will be discussed since the other is symmetrical. Tonneau cover mechanism 101 includes a scissor linkage assembly 103 having an arcuate gooseneck link 105, a pair of parallel links 107 and 109, a follower gooseneck link 111 and a straight trailing link 113. A hydraulic actuator 115 has a cylinder end 117 pivotally coupled to a distal end of follower gooseneck link 111 and an intermediate section of gooseneck link 105. An end of a linearly extendable piston rod 119 of actuator 115 is pivotally coupled between projecting walls of a stationary, body-mounted bracket 121. Proximal ends of gooseneck link 105 and follower gooseneck link 111 are also pivotally coupled to bracket 121. A proximal end of trailing link 113 is similarly pivotally coupled to bracket 121. A distal end of trailing link 113 is pivotally attached to link 109. An opposite end of link 109 is pivotally mounted to an L-shaped support 131 which, in turn, is fastened to an inside surface of tonneau cover 29. Link 107 also has a first end pivotally coupled to support 131 and an opposite end pivotally attached to a straight distal end of gooseneck link 105.

Tonneau cover mechanism 101 defines a six-bar linkage arrangement. Accordingly, when a hydraulic pump 133 (see FIG. 5) is energized, tonneau cover mechanism 101 will cause tonneau cover 29 to vertically raise while simultaneously rearwardly pivoting from the closed position of FIG. 12 to the open position of FIG. 14. This allows roofs 23 and 25 to enter roof storage area 35 (see FIGS. 2 and 9). Tonneau cover 29 will be automatically returned to its closed position in order to cover and externally hide the stowed roofs. All of the top stack mechanism actuators and tonneau cover actuators may be controlled in accordance with the control system disclosed in U.S. Pat. No. 5,451,849 entitled "Motorized Self-Correcting Automatic Convertible Top" which issued to Porter et al. on Sep. 19, 1995, which is incorporated by reference herein.

Figure 15:
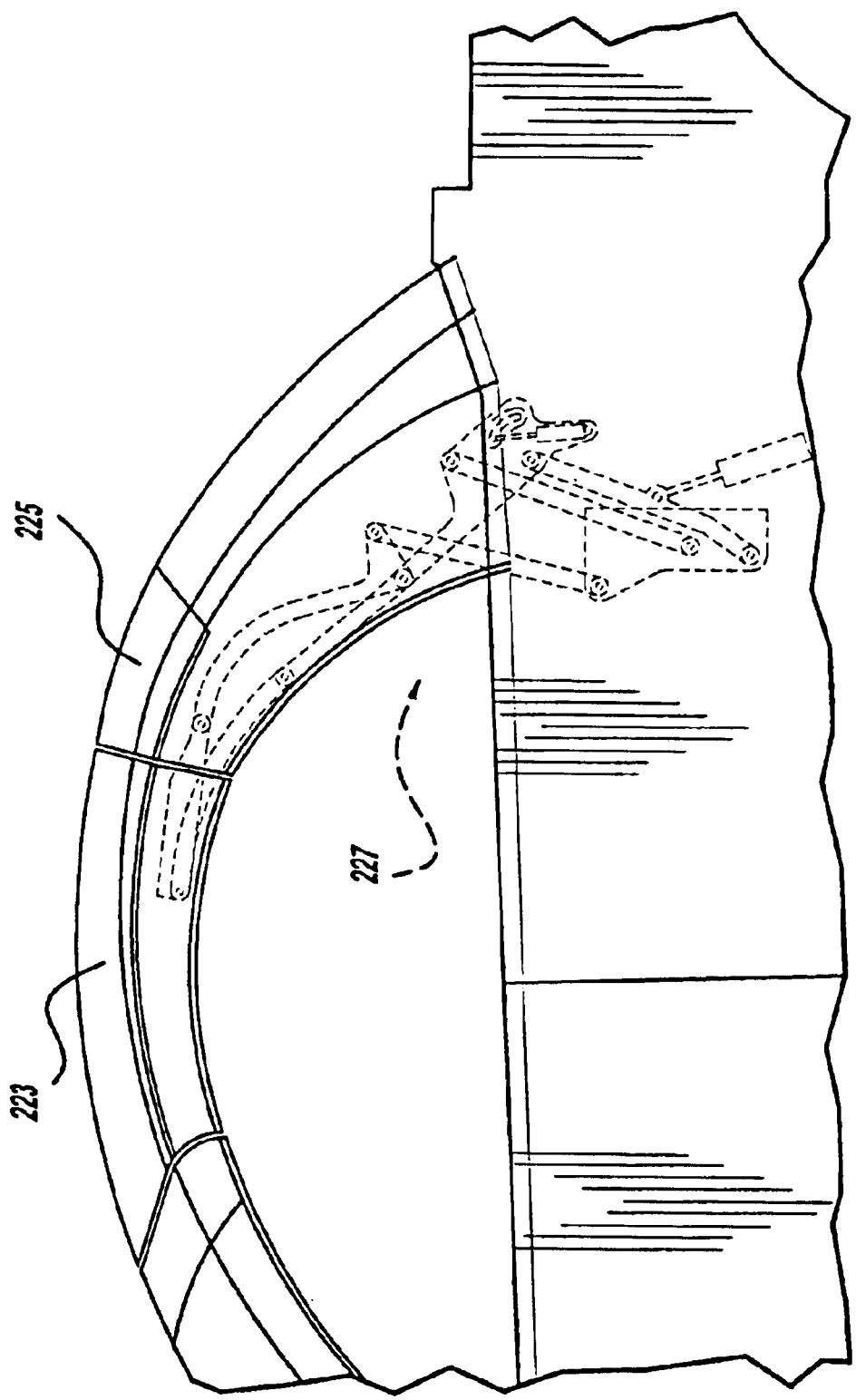
FIG. 15 is a side elevational view showing an alternate embodiment hard-top convertible roof system of the present invention disposed in a fully closed position.
Figure 16:
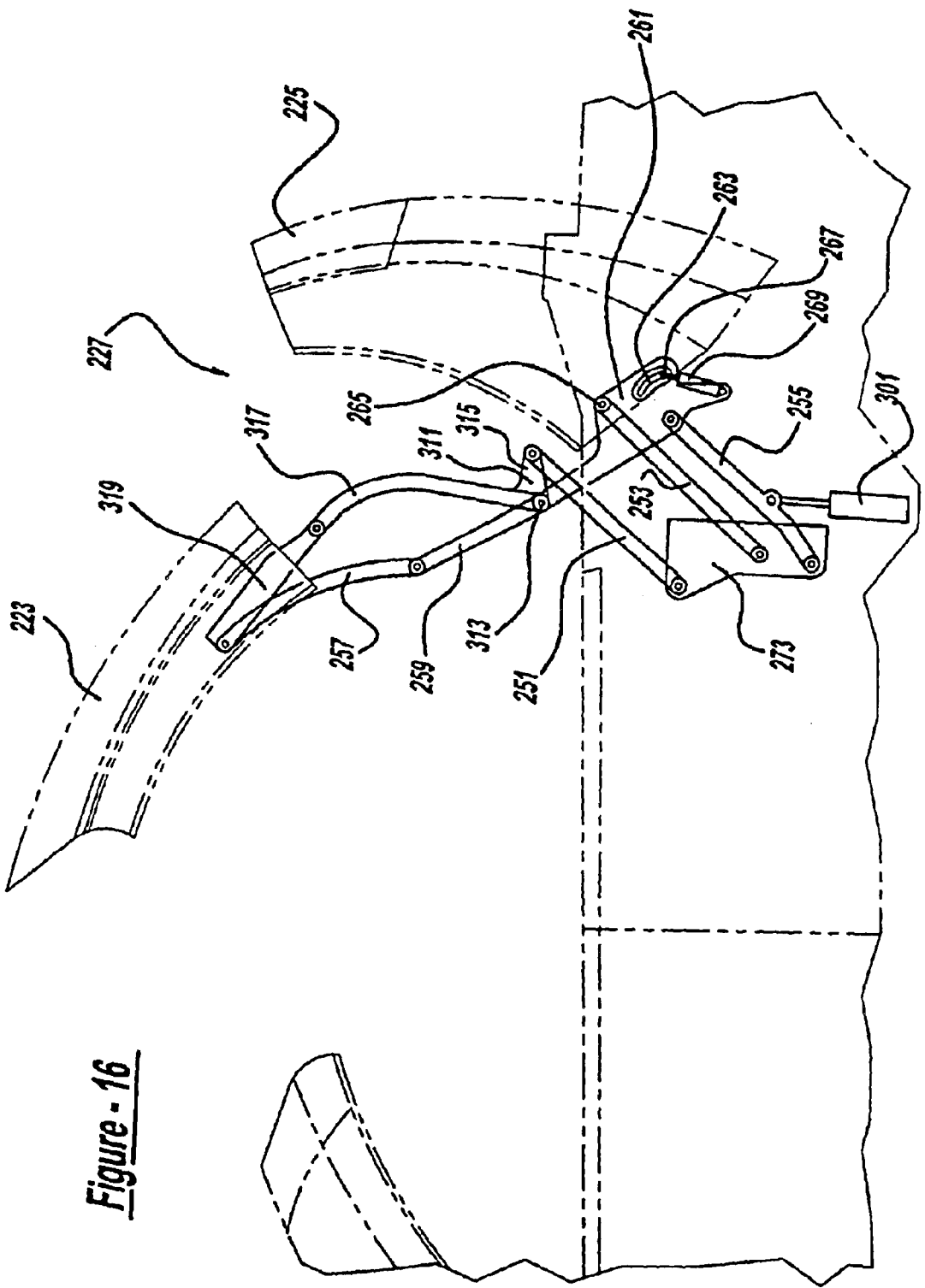
FIG. 16 is a side diagrammatic view showing a top stack mechanism employed in the alternate embodiment hard-top convertible roof system, disposed in a partially retracted position.
Figure 17:
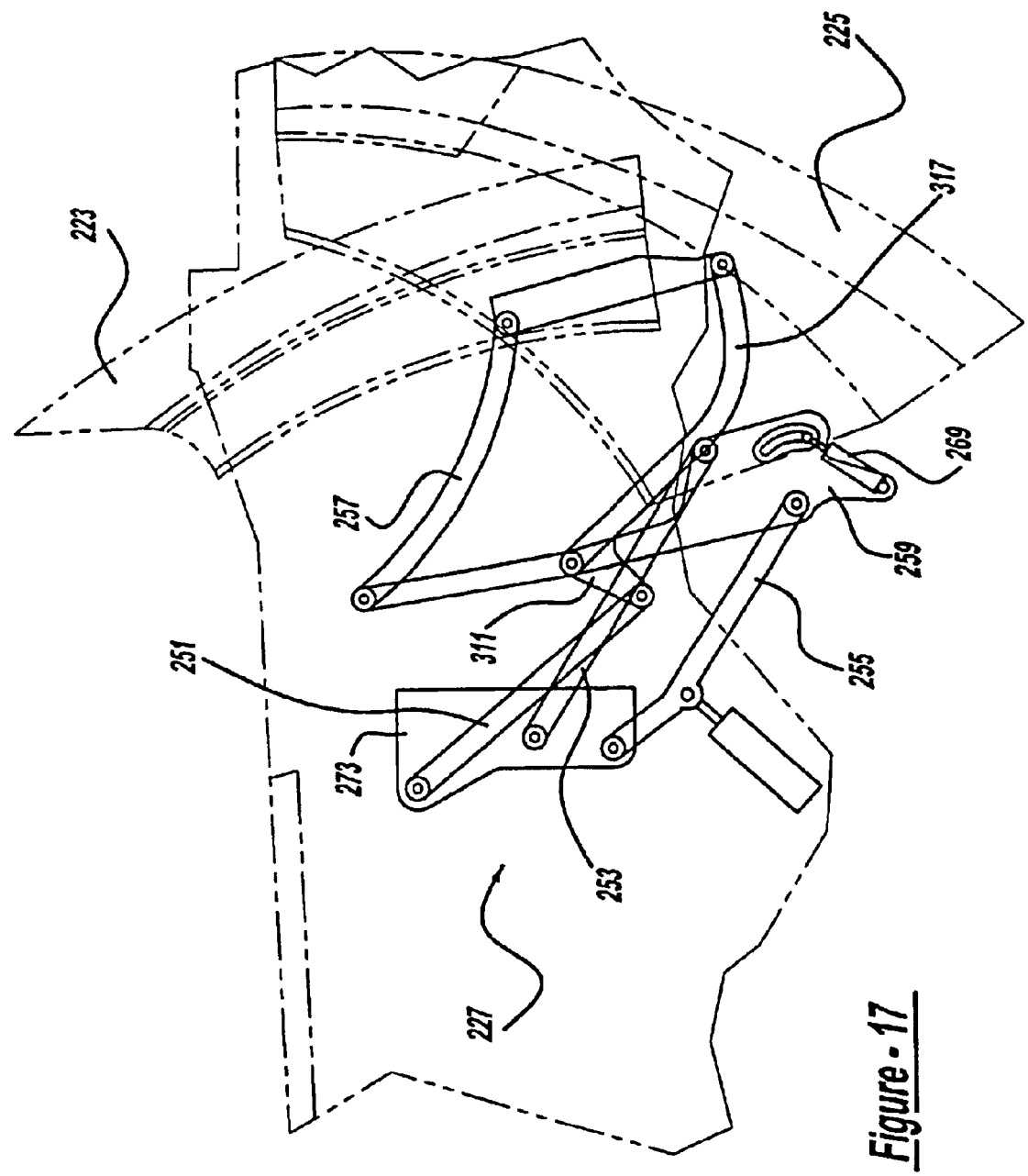
FIG. 17 is a side diagrammatic view showing the top stack mechanism employed in the alternate embodiment hard-top convertible roof system, disposed in a further partially retracted position.
Figure 18:
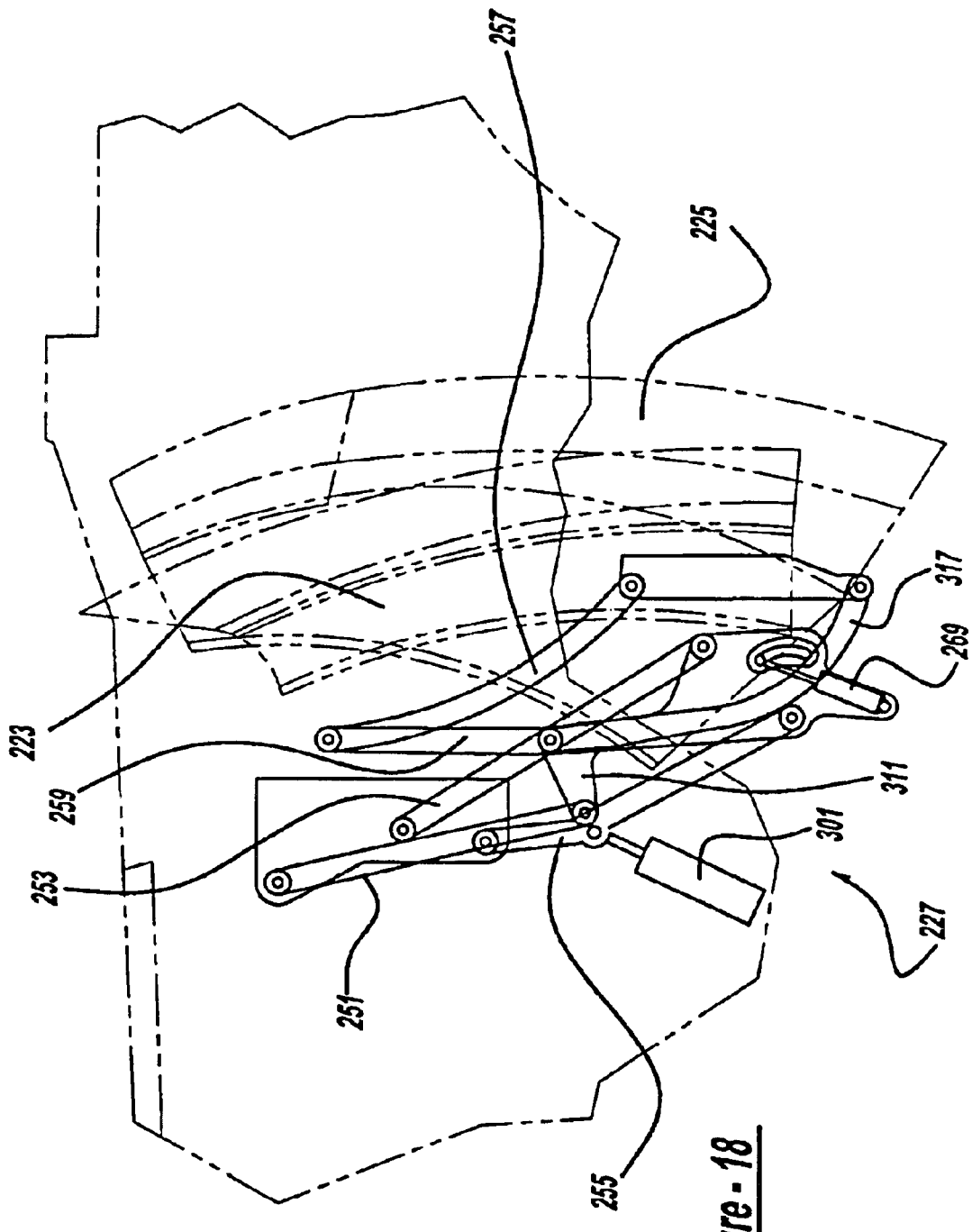
FIG. 18 is a side diagrammatic view showing the top stack mechanism in the alternate embodiment hard-top convertible roof system, disposed in a fully retracted position.

An alternate embodiment hard-top convertible roof system is illustrated in FIGS. 15–19. A hard-top front roof 223 and a hard-top rear roof 225 are movable from a fully raised position, as shown in FIG. 15, to a fully retracted and open position, as shown in FIG. 18, by way of a top stack linkage mechanism 227. Top stack mechanism 227 includes three primary links 251, 253 and 255 which all have proximal ends pivotally attached to a stationary, body-mounted bracket 273. A secondary linkage mechanism of top stack mechanism 227 includes a curved forward link 257 and a rear link 259. Rear link 259 has an enlarged end section 261 with an arcuately shaped camming surface or slot 263. Distal ends of primary links 253 and 255 are pivotally coupled to enlarged section 261 of rear link 259. Rear roof 225 is coupled to rear link 259 and the primary links 253 and 255 at pivot points 265 and 267.

Figure 19:
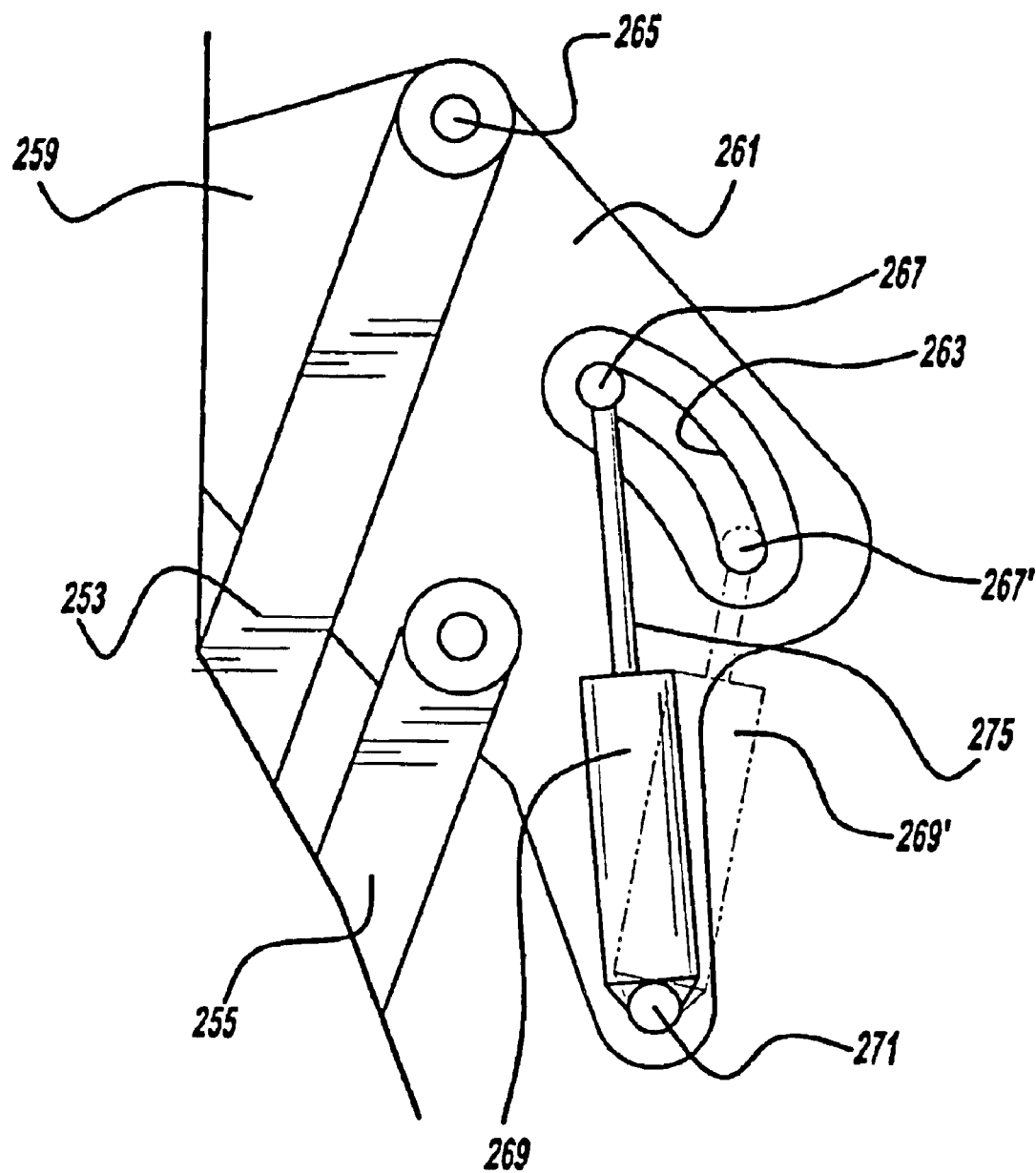
FIG. 19 is an enlarged side elevational view showing a supplemental automatic actuator of the top stack mechanism employed in the alternate embodiment hard-top convertible roof system.

A supplemental actuator 269 has a first end pivotally secured to rear link 259 at a fixed pivot axis 271; this can best be observed by reference to FIG. 19. Supplemental actuator 269 is preferably a relatively small hydraulic cylinder having a linearly movable piston rod 275 with a rod end attached to pivot 267 of rear roof 225 (see FIG. 16). Thus, pivot 267 acts as a cam follower relative to camming slot 263, whereby energization of actuator 269 causes rear roof pivot 267 to move along the camming slot path in order to rotate rear roof about the fixed pivot axis corresponding to pivot 265. This movement serves to further tighten the nested front and rear roofs and minimize their required fore-and-aft packaging space when in the stored position shown in FIG. 18. In other words, retracted actuation of primary hydraulic actuator 301 will cause the gross retracted movement from the position shown in FIG. 15 to that shown in FIG. 17. Primary actuator 301 will further cause top stack mechanism 227 to completely collapse to its retracted position. Supplemental actuator 269 will automatically provide fine motion control of rear roof 225 when top stack mechanism 227 is moved between the positions shown in FIGS. 17 and 18. The final retracted forward rotation of rear roof 225 is caused by energization of supplemental actuator 269 which enables rear roof 225 to become much closer to the fully retracted front roof 223 and provide a smaller stowed package. Reverse advancing movement is opposite that described. If desired, this fine supplemental movement can alternately occur concurrently while the rear roof is also moving through the body opening of the roof storage space.

It should be appreciated that this supplemental fine movement motion can also be applied to a fabric covered, soft-top roof or to a horizontally stowed hard-top roof system. Exemplary soft-top roofs are disclosed in U.S. Pat. No. 5,903,119 entitled "Convertible Roof Actuation Mechanism" which issued to Laurain et al. on May 11, 1999, and U.S. Pat. No. 5,772,274 entitled "Motorized Drive System for a Convertible Roof of an Automotive Vehicle" which issued to Tokarz on Jun. 30, 1998, both of which are incorporated by reference herein. The supplemental actuator would have the cylinder attached to one link and the end of the piston rod attached to another link.

A bellcrank 311 has a central pivot 313 attached to an intermediate section of roof link 259. A short offset bellcrank arm 315 has an end pivotally coupled to a distal end of primary link 251 while an end of an elongated bellcrank arm 317 is pivotally coupled to a front roof bracket 319 or roof inner structure. Front roof bracket 319 is also pivotally coupled to an end of forward link 257. Accordingly, energized movement of primary actuator 301 causes primary link 255 to rotate rear link 259 and rear roof 225 about pivot 265. This motion further causes bellcrank 311 to be rotated by primary link 251 relative to rear link 259. This bellcrank motion serves to rotate and collapse front roof 223 relative to rear roof 225.

While various embodiments of the hard-top convertible roof system have been disclosed, it should be appreciated that variations may be made to the present invention. For example, additional or fewer links may be employed in the presently disclosed top stack mechanisms. Furthermore, the hard-top roofs can be covered with vinyl, fabric or painted, or can include transparent glass panels. Moreover, electric motor actuators can be used in place of one or more of the disclosed hydraulic actuators. It should also be appreciated that the trunk compartment can be in front of the passenger compartment for a mid or rear engine vehicle. While various materials and shapes have been disclosed, it should be appreciated that various other shapes and materials can be employed. It is intended by the following claims to cover these and any other departures from the disclosed embodiments which fall within the true spirit of this invention.

The invention claimed is:

1. A convertible roof system comprising:
    a front roof section;
    a rear roof section;
    a top stack mechanism coupled to the front and rear roof sections;
    a primary automatic actuator coupled to the top stack mechanism, the primary actuator and the top stack mechanism serving to move the front and rear roof sections between retracted and raised positions; and
    a supplemental automatic actuator coupled to at least one of: (a) the top stack mechanism, and (b) the roof sections, the supplemental actuator operably moving at least a portion of the roof sections toward each other after a majority of front and rear roof retraction has occurred in order to more closely store together the fully retracted front and rear roof sections.

2. The system of claim 1 wherein the rear roof section is retracted to a substantially vertical position.

3. The system of claim 2 wherein the front roof section is retracted to a substantially vertical position.

4. The system of claim 1 wherein external surfaces of the front and rear roof sections are retracted to substantially parallel orientations facing substantially the same direction in an overlapping manner.

5. The system of claim 1 wherein at least one of the roof sections defines a hard-top roof section.

6. The system of claim 1 wherein one portion of the supplemental actuator is coupled to the top stack mechanism and another portion of the supplemental actuator is coupled to the rear roof section.

7. The system of claim 1 further comprising a camming surface and a cam follower operably acting with the supplemental actuator to control the compacting movement between the roof sections during retraction.

8. The system of claim 1 wherein the top stack mechanism includes at least two substantially parallel links pivotally coupling a stationary bracket to the rear roof, and the primary actuator is attached to one of the substantially parallel links.

9. The system of claim 1 wherein the primary and supplemental actuators are fluid powered and have a linearly extendable piston rod.

10. A method of operating a convertible roof system having a front roof section, a rear roof section, a primary actuator and a supplemental actuator, the method comprising:

(a) automatically retracting the roof sections from raised positions to mostly stowed positions through actuation of the primary actuator; and (b) automatically moving a majority of at least one of the roof sections closer to the other of the roof sections through actuation of the supplemental actuator.

11. The method of claim 10 further comprising nesting the roof sections adjacent each other in a substantially vertical orientation when stowed.

12. The method of claim 10 further comprising stowing the roof sections with their raised outside surfaces in a rearwardly facing direction.

13. The method of claim 10 further comprising rotating the rear roof section during final retraction movement by camming the rear roof section.

14. The method of claim 10 further comprising moving the entire supplemental actuator with a member coupled to the rear roof section for at least a majority of the retracted movement of the rear roof section, wherein the roof sections are hard-top roof sections.

15. The method of claim 10 further comprising supplying pressurized fluid to the supplemental actuator to linearly extend a rod mounted to one of the roof sections.

16. An automotive vehicle comprising:

a convertible roof including a retractable, front, hard-top roof section and a linkage assembly coupled to the front roof section;

a first automatic actuator operably retracting the linkage assembly and the front roof section throughout a substantially full range of retracted movement; and at least a second automatic actuator operably moving a portion of the convertible roof only during a limited range of movement less than the full range in order to reduce a stowed dimension of the convertible roof.

17. The vehicle of claim 16 wherein the convertible roof includes a retractable, rear, hard-top roof section.

18. The system of claim 17 wherein the rear roof section is retracted to a substantially vertical position.

19. The system of claim 18 wherein the front roof section is retracted to a substantially vertical position.

20. The system of claim 17 wherein external surfaces of the front and rear roof sections are retracted to substantially parallel orientations facing substantially the same direction in an overlapping manner.

21. The vehicle of claim 16 further comprising a rigid tonneau cover automatically movable to allow the convertible roof to retract into a roof storage compartment.

22. The vehicle of claim 21 further comprising a pickup truck bed located behind the roof storage compartment.

23. The vehicle of claim 16 further comprising a camming surface and a cam follower operably acting with the second actuator to control compacting movement of the convertible roof during retraction.

24. The vehicle of claim 16 wherein the automatic actuators are fluid powered and have a linearly extendable piston rod.

25. An automotive vehicle comprising:

a passenger compartment including a beltline;

a convertible roof movable from a raised position covering the passenger compartment to a fully retracted position exposing the passenger compartment;

a primary actuator operably moving the entire convertible roof;

a supplemental actuator always located below the beltline, the supplemental actuator operably compressing the convertible roof at a positional range between a half-retracted position and the fully retracted position.

26. The vehicle of claim 25 wherein the convertible roof includes a front, hand-top roof section and a linkage assembly, the linkage assembly being coupled to the front roof section and the primary actuator.

27. The vehicle of claim 26 wherein the convertible roof includes a retractable, rear, hard-top roof section.

28. The system of claim 26 wherein the front roof section is retracted to a substantially vertical position.

29. The vehicle of claim 26 further comprising a rigid tonneau cover automatically movable to allow the convertible roof to retract into a roof storage compartment.

30. The vehicle of claim 25 further comprising a camming surface and a cam follower operably acting with the supplemental actuator to control compacting movement of the convertible roof during retraction.

31. The vehicle of claim 25 wherein the actuators are fluid powered and have a linearly extendable piston rod.

32. The vehicle of claim 25 wherein the supplemental actuator compresses together front and a rear portions of the convertible roof in a fore-aft direction.

* * * * *

UNITED STATES PATENT AND TRADEMARK OFFICE
CERTIFICATE OF CORRECTION

PATENT NO. : 6,866,325 B2
DATED : March 15, 2005
INVENTOR(S) : Michael T. Willard It is certified that error appears in the above-identified patent and that said Letters Patent is hereby corrected as shown below:

Title page,
Item [56], References Cited, OTHER PUBLICATIONS,
"Buick Blackhawk" reference, "appliation" should be -- application --;
"Ford Mustang" reference, "appliation" should be -- application --;
"Automotive Revue" reference, "translation." should be -- translation). --.

Column 8,
Line 39, "hand-top" should be -- hard-top --.

Signed and Sealed this

Third Day of January, 2006

JON W. DUDAS
*Director of the United States Patent and Trademark Office*